United States Patent
Taherzadeh Boroujeni et al.

(10) Patent No.: US 11,611,896 B2
(45) Date of Patent: Mar. 21, 2023

(54) MEASUREMENT TECHNIQUES FOR REPORTING BEAMS

(71) Applicant: QUALCOMM Incorporated, San Diego, CA (US)

(72) Inventors: Mahmoud Taherzadeh Boroujeni, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/217,499

(22) Filed: Mar. 30, 2021

(65) Prior Publication Data

US 2022/0322119 A1    Oct. 6, 2022

(51) Int. Cl.
  *H04W 24/10*   (2009.01)
  *H04B 17/318*  (2015.01)
  *H04B 17/336*  (2015.01)
  *H04W 16/28*   (2009.01)

(52) U.S. Cl.
  CPC .......... *H04W 24/10* (2013.01); *H04B 17/318* (2015.01); *H04B 17/336* (2015.01); *H04W 16/28* (2013.01)

(58) Field of Classification Search
  CPC .... H04W 24/10; H04W 16/28; H04B 17/318; H04B 17/336
  See application file for complete search history.

(56) References Cited

U.S. PATENT DOCUMENTS

| | | | | |
|---|---|---|---|---|
| 6,574,461 | B1* | 6/2003 | Skold | H04B 7/082 455/132 |
| 2014/0328327 | A1* | 11/2014 | Xiao | H04B 17/336 370/332 |
| 2017/0208583 | A1* | 7/2017 | Jiang | H04L 5/1469 |
| 2017/0280468 | A1* | 9/2017 | Harada | H04W 16/14 |

(Continued)

OTHER PUBLICATIONS

CATT: "Enhancements on Multi-Beam Operation", 3GPP Draft, R1-2100343, 3GPP TSG RAN WG1 #104-e, 3rd Generation Partnership Project (3GPP), Mobile Competence Centre, 650, Route Des Lucioles, F-06921, Sophia-Antipolis Cedex, France, vol. RAN WG1, no. e-Meeting, Jan. 25, 2021-Feb. 5, 2021, Jan. 19, 2021 (Jan. 19, 2021), XP051970946, 17 Pages, Retrieved from the Internet: URL: https://ftp.3qpp.org/tsg_ran/WG1_RL1/TSGR1_104-e/Docs/R1-2100343.zip [retrieved on Jan. 19, 2021] p. 11/17.

(Continued)

*Primary Examiner* — Tejis Daya
(74) *Attorney, Agent, or Firm* — Holland & Hart LLP

(57) ABSTRACT

Methods, systems, and devices for wireless communications are described. In some examples, a user equipment (UE) may identify a configuration for reporting a set of directional beams and measurement information for the set of directional beams to a base station. The configuration may include a first metric for selecting the set of directional beams and a second metric for determining the measurement information. During a beam management procedure, the UE may select the set of directional beams according to the first metric and transmit a report indicating the selected set of directional beams along with the measurement information according to the second metric.

30 Claims, 16 Drawing Sheets

(56) References Cited

U.S. PATENT DOCUMENTS

| | | |
|---|---|---|
| 2018/0033447 A1* | 2/2018 | Ramprashad .......... G10L 25/21 |
| 2019/0082331 A1* | 3/2019 | Raghavan ............. H04W 24/02 |
| 2019/0268118 A1 | 8/2019 | Sadiq et al. |
| 2020/0145068 A1 | 5/2020 | Chendamarai Kannan et al. |
| 2020/0259545 A1 | 8/2020 | Bai et al. |
| 2021/0092624 A1 | 3/2021 | Ryu et al. |
| 2021/0160881 A1* | 5/2021 | Rahman ................ H04L 5/0091 |

OTHER PUBLICATIONS

International Search Report and Written Opinion—PCT/US2022/017498—ISA/EPO—dated Jun. 1, 2022.

NTT Docomo, Inc: "Discussion on Multi-Beam Enhancement", 3GPP Draft, 3GPP TSG RAN WG1 Meeting #94bis, Tdoc: R1-1811349, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518752, 11 Pages, Retrieved from the Internet: URL: http://www.3gpp.org/ftp/tsg%5Fran/WG1%5FRL1/TSGR1%5F94b/Docs/R1%2D1811349%2Ezip [retrieved on Sep. 29, 2018], Section 5, pp. 7-8., section 5.2, p. 7/11.

* cited by examiner

| CSI Report Number | CSI Fields |
|---|---|
| CSI Report #n | CRI or SSBRI #1 — 305-a |
| | CRI or SSBRI #2 — 305-b |
| | CRI or SSBRI #3 — 305-c |
| | CRI or SSBRI #4 — 305-d |
| | SINR or RSRP #1 — 310-a |
| | SINR or RSRP #2 — 310-b |
| | SINR or RSRP #3 — 310-c |
| | SINR or RSRP #4 — 310-d |
| | Criteria Flag — 315 |

300

MEASUREMENT TECHNIQUES FOR REPORTING BEAMS

FIELD OF TECHNOLOGY

The following relates to wireless communications, including measurement techniques for reporting beams.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

During beam management procedures, a UE may select a subset of directional beams from a set of directional beams corresponding to signals received from the base station and report the subset of directional beams to the base station. In some examples, the UE may select the subset of directional beams based on signal measurements. Some techniques for measuring and reporting directional beams may provide an inaccurate indication of a quality of a directional beam.

SUMMARY

The described techniques relate to improved methods, systems, devices, and apparatuses that support measurement techniques for reporting beams. Generally, the described techniques provide for a user equipment (UE) to select directional beams based on signal measurements according to a first metric and construct a report including signal measurements for the selected directional beams according to a second metric during beam management procedures.

A method for wireless communication at a UE is described. The method may include identifying a configuration for reporting a set of directional beams and measurement information for the set of directional beams, the configuration including at least a first metric for selecting the set of directional beams from a set of multiple candidate directional beams and a second metric, that is different from the first metric, for determining the measurement information, selecting the set of directional beams according to the first metric, and transmitting, to a base station, a report indicating the measurement information according to the second metric and the set of directional beams.

An apparatus for wireless communication at a UE is described. The apparatus may include a processor, memory coupled with the processor, and instructions stored in the memory. The instructions may be executable by the processor to cause the apparatus to identify a configuration for reporting a set of directional beams and measurement information for the set of directional beams, the configuration including at least a first metric for selecting the set of directional beams from a set of multiple candidate directional beams and a second metric, that is different from the first metric, for determining the measurement information, select the set of directional beams according to the first metric, and transmit, to a base station, a report indicating the measurement information according to the second metric and the set of directional beams.

Another apparatus for wireless communication at a UE is described. The apparatus may include means for identifying a configuration for reporting a set of directional beams and measurement information for the set of directional beams, the configuration including at least a first metric for selecting the set of directional beams from a set of multiple candidate directional beams and a second metric, that is different from the first metric, for determining the measurement information, means for selecting the set of directional beams according to the first metric, and means for transmitting, to a base station, a report indicating the measurement information according to the second metric and the set of directional beams.

A non-transitory computer-readable medium storing code for wireless communication at a UE is described. The code may include instructions executable by a processor to identify a configuration for reporting a set of directional beams and measurement information for the set of directional beams, the configuration including at least a first metric for selecting the set of directional beams from a set of multiple candidate directional beams and a second metric, that is different from the first metric, for determining the measurement information, select the set of directional beams according to the first metric, and transmit, to a base station, a report indicating the measurement information according to the second metric and the set of directional beams.

In some examples of the method, apparatuses, and non-transitory computer-readable medium described herein, identifying the configuration may include operations, features, means, or instructions for receiving signaling indicating the configuration from the base station.

In some examples of the method, apparatuses, and non-transitory computer-readable medium described herein, the signaling indicating the configuration includes radio resource control (RRC) signaling, medium access control control element (MAC-CE) signaling, or downlink control information (DCI) signaling.

Some examples of the method, apparatuses, and non-transitory computer-readable medium described herein may further include operations, features, means, or instructions for transmitting signaling indicating the first metric and the second metric to the base station, where transmitting the signaling indicating the first metric and the second metric may be based on identifying the configuration.

In some examples of the method, apparatuses, and non-transitory computer-readable medium described herein, the signaling indicating the first metric and the second metric includes MAC-CE signaling or PUCCH signaling.

In some examples of the method, apparatuses, and non-transitory computer-readable medium described herein, the signaling indicating the first metric and the second metric includes an indication in the report.

Some examples of the method, apparatuses, and non-transitory computer-readable medium described herein may further include operations, features, means, or instructions for determining a change in channel conditions, where identifying the configuration may be based on determining the change in channel conditions.

In some examples of the method, apparatuses, and non-transitory computer-readable medium described herein, the first metric includes average reference signal received power (RSRP) over a time duration and the second metric includes instantaneous RSRP.

In some examples of the method, apparatuses, and non-transitory computer-readable medium described herein, the first metric includes average signal-to-interference-plus-noise ratio (SINR) over a time duration and the second metric includes instantaneous SINR.

In some examples of the method, apparatuses, and non-transitory computer-readable medium described herein, the first metric includes RSRP and the second metric includes SINR.

In some examples of the method, apparatuses, and non-transitory computer-readable medium described herein, the first metric includes SINR and the second metric includes RSRP.

In some examples of the method, apparatuses, and non-transitory computer-readable medium described herein, the report indicating the measurement information includes a channel state information (CSI) report.

A method for wireless communication at a base station is described. The method may include identifying a configuration for a UE to report a set of directional beams and measurement information for the set of directional beams, the configuration including at least a first metric for the UE to select the set of directional beams from a set of multiple candidate directional beams and a second metric, that is different from the first metric, for the UE to determine the measurement information and receiving, from the UE, a report indicating the measurement information according to the second metric and the set of directional beams.

An apparatus for wireless communication at a base station is described. The apparatus may include a processor, memory coupled with the processor, and instructions stored in the memory. The instructions may be executable by the processor to cause the apparatus to identify a configuration for a UE to report a set of directional beams and measurement information for the set of directional beams, the configuration including at least a first metric for the UE to select the set of directional beams from a set of multiple candidate directional beams and a second metric, that is different from the first metric, for the UE to determine the measurement information and receive, from the UE, a report indicating the measurement information according to the second metric and the set of directional beams.

Another apparatus for wireless communication at a base station is described. The apparatus may include means for identifying a configuration for a UE to report a set of directional beams and measurement information for the set of directional beams, the configuration including at least a first metric for the UE to select the set of directional beams from a set of multiple candidate directional beams and a second metric, that is different from the first metric, for the UE to determine the measurement information and means for receiving, from the UE, a report indicating the measurement information according to the second metric and the set of directional beams.

A non-transitory computer-readable medium storing code for wireless communication at a base station is described. The code may include instructions executable by a processor to identify a configuration for a UE to report a set of directional beams and measurement information for the set of directional beams, the configuration including at least a first metric for the UE to select the set of directional beams from a set of multiple candidate directional beams and a second metric, that is different from the first metric, for the UE to determine the measurement information and receive, from the UE, a report indicating the measurement information according to the second metric and the set of directional beams.

In some examples of the method, apparatuses, and non-transitory computer-readable medium described herein, identifying the configuration may include operations, features, means, or instructions for transmitting signaling indicating the configuration to the UE.

In some examples of the method, apparatuses, and non-transitory computer-readable medium described herein, the signaling indicating the configuration includes RRC signaling, MAC-CE signaling, or DCI signaling.

Some examples of the method, apparatuses, and non-transitory computer-readable medium described herein may further include operations, features, means, or instructions for receiving signaling indicating the first metric and the second metric from the UE, where identifying the configuration may be based on receiving the signaling indicating the first metric and the second metric.

In some examples of the method, apparatuses, and non-transitory computer-readable medium described herein, the signaling indicating the first metric and the second metric includes MAC-CE signaling or PUCCH signaling.

In some examples of the method, apparatuses, and non-transitory computer-readable medium described herein, the signaling indicating the first metric and the second metric includes an indication in the report.

Some examples of the method, apparatuses, and non-transitory computer-readable medium described herein may further include operations, features, means, or instructions for determining a change in channel conditions, where identifying the configuration may be based on determining the change in channel conditions.

In some examples of the method, apparatuses, and non-transitory computer-readable medium described herein, the first metric includes average RSRP over a time duration and the second metric includes instantaneous RSRP.

In some examples of the method, apparatuses, and non-transitory computer-readable medium described herein, the first metric includes average SINR over a time duration and the second metric includes instantaneous SINR.

In some examples of the method, apparatuses, and non-transitory computer-readable medium described herein, the first metric includes RSRP and the second metric includes SINR.

In some examples of the method, apparatuses, and non-transitory computer-readable medium described herein, the first metric includes SINR and the second metric includes RSRP.

In some examples of the method, apparatuses, and non-transitory computer-readable medium described herein, the report indicating the measurement information includes a CSI report.

DETAILED DESCRIPTION

Figure 1:
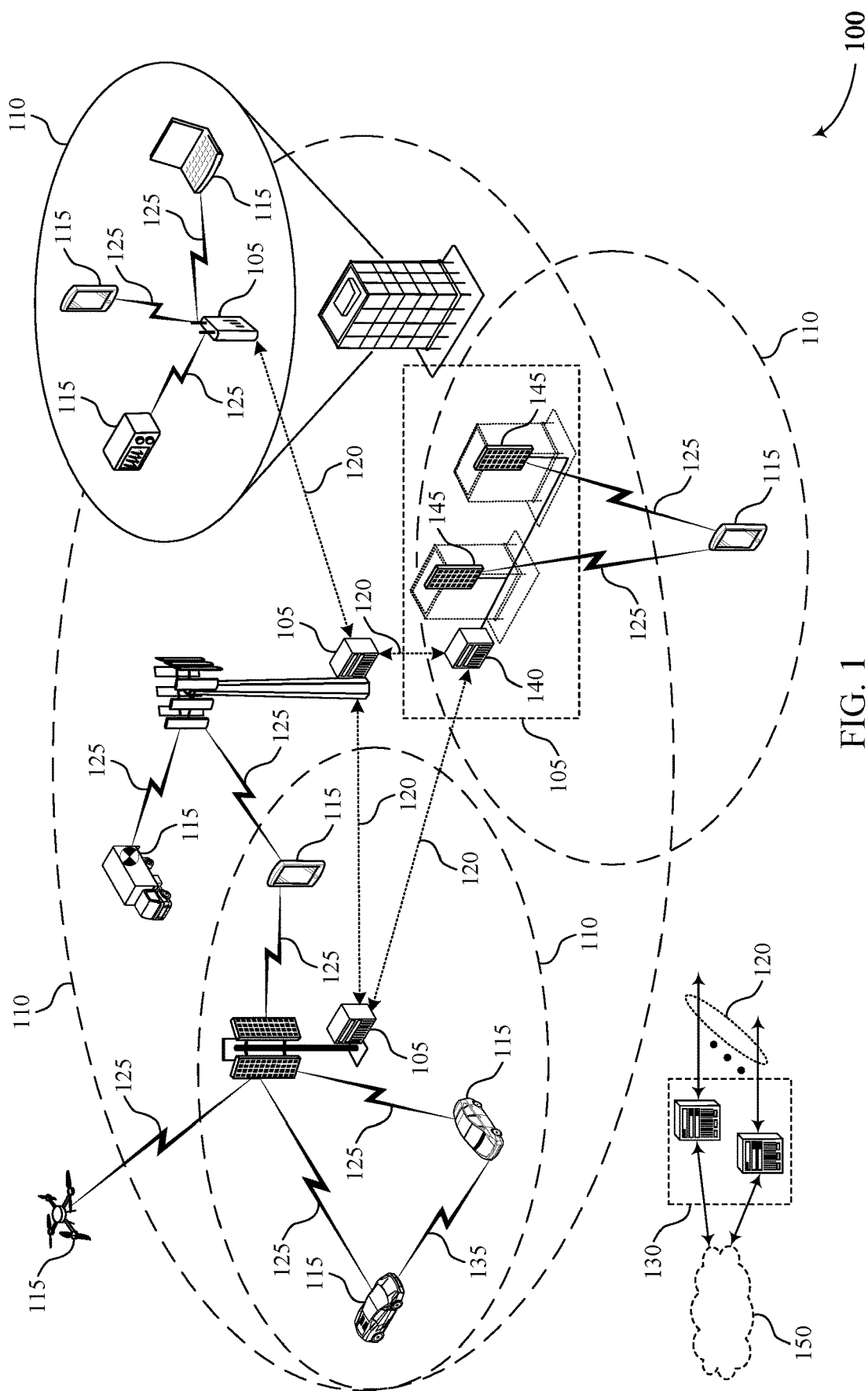
FIGS. 1 and 2 illustrate examples of wireless communications systems that supports measurement techniques for reporting beams in accordance with aspects of the present disclosure.

In some examples, a user equipment (UE) and a base station may undergo beam management procedures. For example, the base station may transmit a series of reference signals (e.g., channel state information reference signals (CSI-RS) or synchronization signals blocks (SSBs)) using unique directional beams. The UE may measure a signal strength (e.g., reference signal received power (RSRP) or signal-to-interference-plus-noise ratio (SINR)) of each directional beam and transmit a report (e.g., a CSI report) to the base station indicating a set of directional beams having the highest signal strength as well as signal strength measurements for the one or more directional beams. In some examples, the UE may select directional beams based on instantaneous SINR measurements and report the instantaneous SINR measurements for the selected directional beams to the base station. If the base station and the UE are located within an area with many close cells, instantaneous SINR for directional beams may change drastically over time due to cross-link interference. In such case, the UE may select and report directional beams whose instantaneous SINR measurements are good (e.g., above a threshold), but may fail to select and report directional beams whose overall SINR (e.g., average SINR over some time period) measurements are good (e.g., above a threshold). As a result, the base station may fail to receive information on directional beams whose overall behavior may prove useful for future scheduling.

In some examples, a UE may utilize one metric for selecting directional beams and utilize a different metric when reporting measurement values for the selected directional beams during beam management procedures. For example, the UE may identify a configuration for reporting directional beams. The configuration may include instructions for the UE to determine signal measurement values for each of the directional beams according to a first metric and a second metric. In some examples, the first metric may be average SINR or RSRP and the second metric may be instantaneous SINR or RSRP, respectively. The UE may utilize the determined signal measurement values corresponding to the first metric to select directional beams. For example, the UE may select a few directional beams with the highest signal measurement values of all the directional beams according to the first metric. Additionally, the UE may construct a report including signal measurement values for the selected directional beams according to the second metric as well as indication of the selected directional beams and transmit the report to the base station.

In some examples, the UE may determine the configuration autonomously and may transmit an indication of the metrics for reporting beams to the base station such that the base station may interpret the report. The indication may be included in a medium access control control element (MAC-CE) or physical uplink control channel (PUCCH) signaling. In other examples, the base station may transmit a configuration including the metrics for reporting beams to the UE and the UE may use the configuration for beam selection and reporting. The configuration may be included as part of CSI report settings or the configuration may be indicated to the UE dynamically via a MAC-CE or downlink control information (DCI). By utilizing different metrics for beam reporting, the UE may report the best overall directional beams (e.g., average signal strength above a threshold) while also keeping the base station informed on the current state (e.g., instantaneous signal strength) of the selected directional beams.

Aspects of the disclosure are initially described in the context of wireless communications systems. Additional aspects are described in the context of process flows. Aspects of the disclosure are further illustrated by and described with reference to apparatus diagrams, system diagrams, and flowcharts that relate to measurement techniques for reporting beams.

FIG. 1 illustrates an example of a wireless communications system 100 that supports measurement techniques for reporting beams in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

As described herein, the UE 115 may utilize two different metrics when reporting directional beams to the base station 105 during beam management procedures. The UE 115 may identify a beam report configuration indicating a first metric (e.g., average SINR) and a second metric (e.g., instantaneous SINR). The UE may use the first metric to select directional beams (e.g., from a set of possible or candidate beams) and the UE may use the second metric when reporting measurement information about the selected directional beams. For example, the UE 115 may receive multiple signals from the base station 105 corresponding to a set of directional beams and determine signal measurement values for each of the directional beams according to the first metric and the second metric. The UE 115 may select a subset of directional beams based on the signal measurement values associated with the first metric and construct a report indicating signal measurement values of each selected subset of directional beams according to the second metric. Additionally, the report may include an indication of the selected subset of directional beams. The UE 115 may transmit the report to the base station 105 and the base station 105 may leverage the report when scheduling or communicating with the UE 115.

Figure 2:
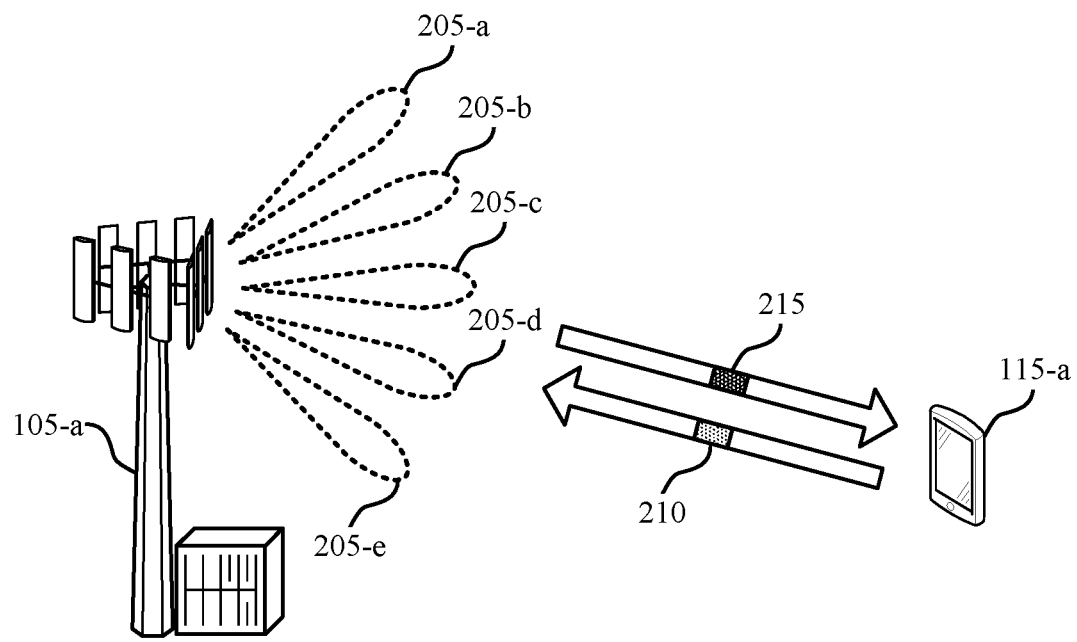

FIG. 2 illustrates an example of a wireless communications system 200 that supports measurement techniques for reporting beams in accordance with aspects of the present disclosure. In some examples, the wireless communications system 200 may implement aspects of a wireless communications system 100. For example, the wireless communications system 200 may include base station 105-a and a UE 115-a which may be examples of a base station 105 and a UE 115 with reference to FIG. 1.

In some examples, the base station 105-a and the UE 115-a may undergo beam management procedures. During beam management procedures, the base station 105-a may transmit a set (e.g., a series) of signals to the UE 115-a using unique directional beams 205. For example, the base station 105-a may transmit the set of signals to the UE 115-a via a directional beam 205-a, a directional beam 205-b, a directional beam 205-c, a directional beam 205-d, and a directional beam 205-d. The set of signals may be an example of a set of SSBs or a set of CSI-RSs. The UE 115-a may receive the set of signals via respective directional beams 205 and measure the signal strength of each signal of the set. For example, the UE 115-a may measure an RSRP or an SINR of each signal. The UE 115-a may determine a subset of signals that have the highest signal strength of the set and indicate the directional beams 205 associated with the subset of signals to the base station 105-a via a report 210. For example, the UE 115-a may determine signals associated with the directional beam 205-c and the directional beam 205-d have the highest measured signal strength of the set and indicate the directional beam 205-c and directional beam 205-d to the base station 105-a via the report 210. In some examples, the report 210 may be an example of a CSI report and may include beam identifiers (IDs) indicating directional beams 205 selected by the UE 115-a (e.g., CSI resource indicator (CRI) or SSBRI), signal strength measurement values associated with the selected directional beams 205 (e.g., L1-RSRP report or L1-SINR report), a channel quality indicator (CQI), a precoding matrix indicator (PMI), a rank indicator (RI), or any combination thereof.

As described above, the UE 115-a may select a subset of directional beams 205 to report to the base station 105-a based on instantaneous SINR measurements of the set of directional beams 205. However, in some examples, the base station 105-a and the UE 115-a may be located in an indoor environment and the indoor environment may include many close cells. As a result of the base station 105-a and the UE 115-a being in the environment, the instantaneous SINR of directional beams 205 may change drastically due to cross-link interference from the other cells. That is, a directional beam 205 whose overall (e.g., average) SINR is good (e.g., above a threshold) may reflect a bad SINR (e.g., below a threshold) at some time instance. In some examples, during that time instance, the UE may undergo a beam management procedure and as such, may select a different directional beam 205. That is, the UE 115-a may fail to report an overall good directional beam 205 to the base station 105-a and as such, the base station 105-a may not have knowledge of this directional beam 205. Using other methods, the base station 105-a may keep track of changes in SINR measurements for all of the directional beams 205. For example, the UE 115-a may report signal measurement values associated with all the directional beams 205 to the base station 105-a. But reporting signal measurements values of all directional beams 205 may be costly in terms of resources and overhead signaling.

As described herein, a UE 115-a may select a subset of directional beams 205 according to a first metric and report signal measurement values associated with the selected subset of directional beams 205 to the base station 105-a according to a second metric. In one example, the base station 105-a may transmit a configuration message 215 to the UE 115-a indicating the metrics for selection of reported beams. The configuration message 215 may instruct the UE 115-a to report a subset of directional beams 205 based on the signal measurement values according to the first metric and report signal measurement values according to the second metric for the selected directional beams 205. In some examples, the UE 115-a may receive the configuration message 215 as part of CSI-RS report settings (e.g., radio resource control (RRC) signaling). Alternatively or additionally, the metrics for selection of reported beams (e.g., the first metric and the second metric) may be indicated to the UE 115-a dynamically. For example, the UE 115-a may receive the configuration message 215 via a MAC-CE or DCI (e.g., DCI that triggers aperiodic CSI reporting or UE-specific or group-common DCI).

In another example, the UE 115-a may autonomously determine to select a subset of directional beams 205 according to the first metric and report signal measurement values of the selected subset of directional beams 205 to the base station 105-a according to the second metric. In such case, the UE 115-a may transmit an indication of the first metric and the second metric to the base station 105-a such that the base station 105-a may interpret the report 210. In some examples, the UE 115-a may transmit the indication of the first metric and the second metric via the report 210. For example, the UE 115-a may include a flag in a report 210 (e.g., CSI report) to that indicates the first metric and the second metric. Alternatively, the UE 115-a may indicate the first metric and the second metric to the base station 105-a via an uplink MAC-CE or PUCCH signaling.

In some examples, the first metric may be average SINR and the second metric may be instantaneous SINR. Alternatively, the first metric may be average RSRP and the second metric may be instantaneous RSRP. In other examples, the first metric may be instantaneous RSRP and the second metric may be instantaneous SINR. In the case the first metric is average SINR or average RSRP, the configuration message 215 may indicate a time duration to apply when determining signal measurement values of directional beams 205 according to the first metric. In some examples, the UE 115-a may keep track of the instantaneous measurement values of the directional beams 205 for each beam management procedure and average these instantaneous measurement values to determine signal measurement values of the directional beams 205 according to the first metric (in the case the first metric is average SINR or average RSRP). Alternatively, the UE 115-a may apply a temporal filter and determine signal measurement values of directional beams 205 according to the first metric after applying the temporal filter.

As an example, the UE 115-a may determine the first metric to be average SINR and the second metric to be instantaneous SINR (either autonomously or using the configuration message 215). The UE 115-a may then undergo a beam management procedure and receive a set of directional beams 205 (e.g., the directional beam 205-a, the directional beam 205-b, the directional beam 205-c, the directional beam 205-a, the directional beam 205-d, and the directional beam 205-e). The UE 115-a may measure the average SINR of each directional beam 205 as well as the instantaneous SINR of each directional beam 205 and select a subset of directional beams (e.g., two to four directional beams) with the highest measured average SINR of the set of directional beams 205. For example, the UE 115-a may select the directional beam 205-c and the directional beam 205-d. The UE 115-a may then construct the report 210. The report 210 may include an indication of the selected directional beams 205 (e.g., beams IDs of the selected beams) and the instantaneous SINR of the selected directional beams 205. The UE 115-a may transmit the report 210 to the base station 105-a. By utilizing average signal measurement values in the selection of the directional beams 205, the UE 115-a may avoid failing to report an overall good directional beam 205 to the base station 105-a. In addition, the UE 115-a may provide the base station 105-a with instantaneous signal measurement values of the selected directional beams 205 which may give the base station 105-a more insight on current status of directional beams 205.

Figure 3:
FIG. 3 illustrates an example of a channel state information (CSI) report that supports measurement techniques for reporting beams in accordance with aspects of the present disclosure.

FIG. 3 illustrates an example of a CSI report 300 that supports measurement techniques for reporting beams in accordance with aspects of the present disclosure. In some examples, the CSI report 300 may implement aspects of a wireless communications system 100 and a wireless communications system 200.

As described herein, during a beam management procedure, a UE may receive a series of signals from a base station, where each signal is associated with a unique directional beam. The base station may transmit anywhere from 16 to 64 directional beams to the UE. The UE may measure the signal strength of each directional beam according to a first metric and select one or more directional beams using the signal strength measurements. In some examples, the UE may select the one or more directional beams having the highest measured signal strength (e.g., up to 4 directional beams). The first metric may be average SINR or average RSRP and as such, the UE may select the one or more directional beams with the highest average SINR or the highest average RSRP. The UE may also measure the signal strength of the one or more selected directional beams according to the second metric and report the signal strength measurements of the one or more selected beams to the base station via a CSI report 300. In some examples, the second metric may be instantaneous SINR or instantaneous RSRP.

When generating the CSI report 300, the UE may include an indication of the one or more selected beams and an indication of a signal strength measurement according to the second metric for each of the one or more selected beams. For example, fields 305 of CSI report 300 may include a CRI or an SSB resource indicator (SSBRI) for each of the one or more selected directional beams and fields 310 of the CSI report 300 may include average SINR or average RSRP for each of the one or more selected beams. Field 305-a and field 310-a may correspond to a first selected beam, field 305-b and field 310-b may correspond to a second selected beam, field 305-c and field 310-c may correspond to a third selected beam, and field 305-d and field 310-d may correspond to a fourth selected beam. In some examples, the first selected beam may have the highest signal measurement value when compared to the other selected beams (e.g., second selected beam, third selected beam, and fourth selected beam). In such example, the UE may report the absolute value of the signal strength measurement of the first selected beam and report a differential value of the signal strength measurement of the remaining beams, where the differential value is computed with respect to the absolute value. For example, field 310-a may include an indication of the absolute instantaneous SINR or RSRP value for the first selected beam and fields 305-b-305-d may include an indication of a differential instantaneous SINR or RSRP value for the selected second beam, the selected third beam, and the selected fourth beam, respectively.

As described with reference to FIG. 2, the UE may determine the criteria (e.g., the first metric and the second metric) for beam selection and reporting one of two ways. One way is that the UE may receive a configuration from the base station indicating the criteria. Another way is that the UE may autonomously decide the criteria. If the UE autonomously decides the criteria, the UE may indicate the criteria to the base station such that the base station may interpret the CSI report 300. In some examples, the UE may indicate the criteria via the CSI report 300. For example, the CSI report 300 may include a field 315 and the field 315 may include a flag. The flag may serve as an indication to the base station 105-b that the directional beams indicated in the CSI report were selected according to the first metric and the signal measurement values of the selected directional beams indicted in the CSI report are associated with the second metric.

Figure 4:
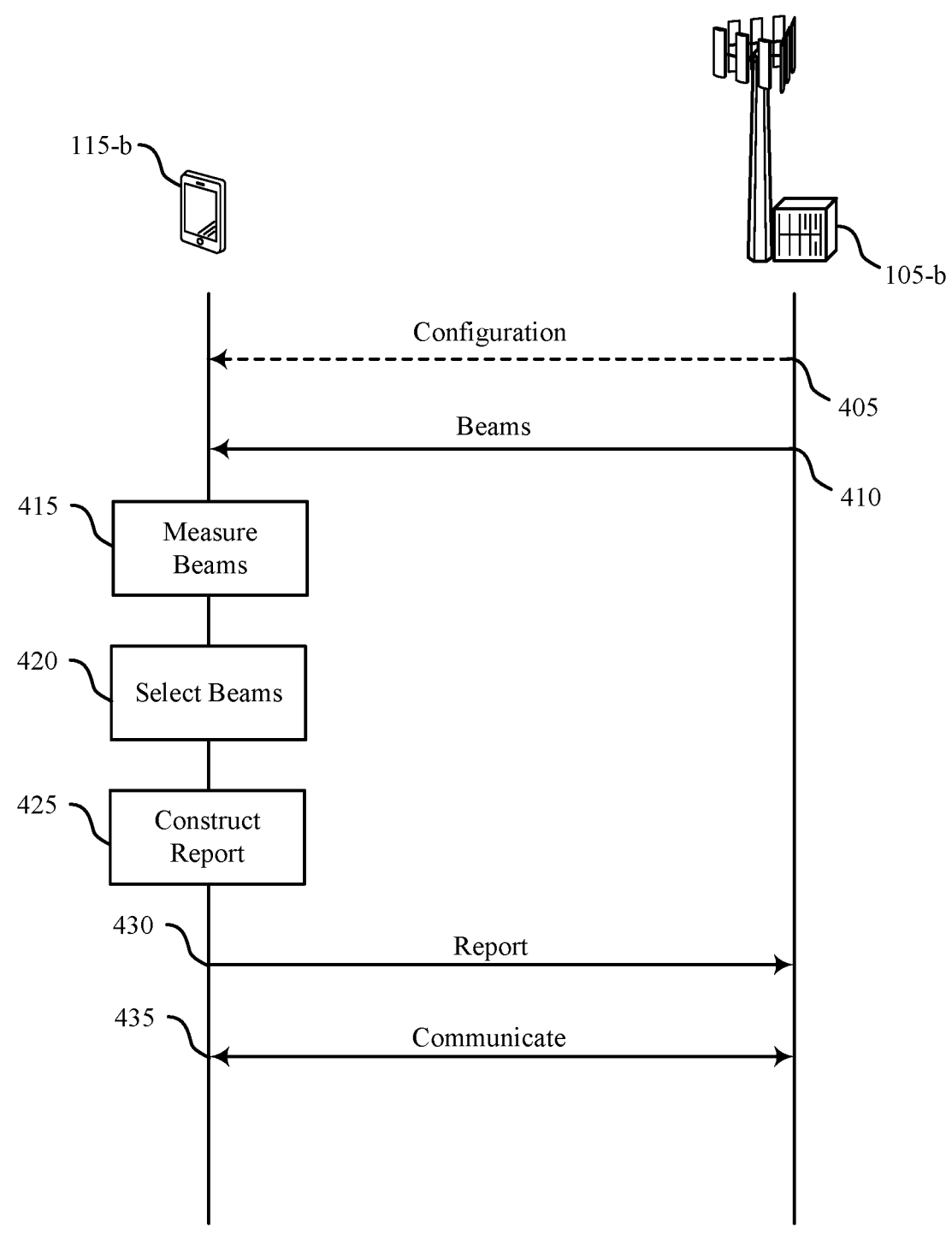
FIG. 4 illustrates an example of a process flow that supports measurement techniques for reporting beams in accordance with aspects of the present disclosure.

FIG. 4 illustrates an example of a process flow 400 that supports measurement techniques for reporting beams in accordance with aspects of the present disclosure. In some examples, the process flow 400 may implement or be implemented by aspects of a wireless communications system 100, a wireless communications system 200, and a CSI report 300. The process flow 400 may involve a UE 115-b receiving signals from a base station 105-b using unique directional beams and reporting a subset of the directional beams based on measurements using a first metric to the base station 105-b. Additionally, the UE 115-b may report measurement information of the selected subset of directional beams according to a second metric to the base station 105-b. Alternative examples of the following may be implemented, where some steps are performed in a different order than described or are not performed at all. In some cases, steps may include additional features not mentioned below, or further steps may be added.

At 405, the UE 115-b may receive a configuration message 405 from the base station 105-b. The configuration message may indicate a first metric for selecting directional beams during a beam management procedure. Additionally, the configuration message may indicate a second metric for reporting measurement values of the selected directional beams during beam management procedures. In some examples, the UE 115-b may receive the configuration as part of CSI report setting. That is, the UE 115-b may receive the configuration via RRC signaling. In another example, the metrics for beam reporting may be indicated dynamically by the base station 105-b. That is, the base station 105-b may transmit the configuration message via a downlink MAC-CE, DCI that triggers aperiodic CSI reporting, UE-specific DCI, or group-common DCI. In some examples, the UE 115-b may determine the metrics for beam reporting on its own without receiving input from the base station 105-b. In such example, the UE 115-d may not receive a configuration message at 405.

At 410, the base station 105-b may transmit signals via a set of directional beams to the UE 115-b. Each directional beam of the set of directional beams may be pointed in a different direction. The signals may be examples of CSI-RS or SSBs.

At 415, the UE 115-b may measure the signals associated with each of the set of directional beams. In some examples, the UE 115-b may utilize the configuration message 405 when measuring the signal strength associated with each of the directional beams. That is, the UE 115-b may determine signal measurement for each directional beam using the first metric and the second metric. In some examples, the first metric may be average SINR or RSRP and the second metric may be instantaneous SINR or RSRP. Alternatively, the first metric may be instantaneous RSRP and the second metric may be instantaneous SINR.

At 420, the UE 115-b may select a subset of directional beams from the set of directional beams based on the signal measurements determined at 415. For example, the UE 115-b may select a subset of directional beams with the highest signal measurement values according to the first metric (e.g., highest average RSRP, average SINR, or instantaneous RSRP) of the remaining directional beams of the set.

At 430, the UE 115-b may construct a report (e.g., CSI report). In some examples, the report may include an indication of the directional beams selected at 420. For example, the report may include a first set of fields, each field of the first set of fields including a unique CRI or SSBRI corresponding to each of the selected directional beams. Additionally, the report may include an indication of signal measurements for the selected subset of directional beams according to the second metric. For example, the report may include a second set of fields, each field of the second set of fields including a signal measurement value according to the second metric (e.g., instantaneous SINR or instantaneous RSRP) corresponding to each of the selected directional beams. In some examples, if the UE 115-b determines metrics for beam reporting autonomously, then the UE 115-b may include an indication of the metrics for beam reporting (e.g., the first metric and the second metric) in the report. Alternatively, the UE 115-b may transmit an indication of the metric for beam reporting to the base station 105-b via an uplink MAC-CE or PUCCH signaling.

At 430, the UE 115-b may transmit the report to the base station 105-b. In some examples, the base station 105-b may communicate with the UE 115-b using the report. That is, the base station 105-b may select a directional beams from the subset of directional beams indicated in the report and communicate via the selected directional beam at 435.

Figure 5:
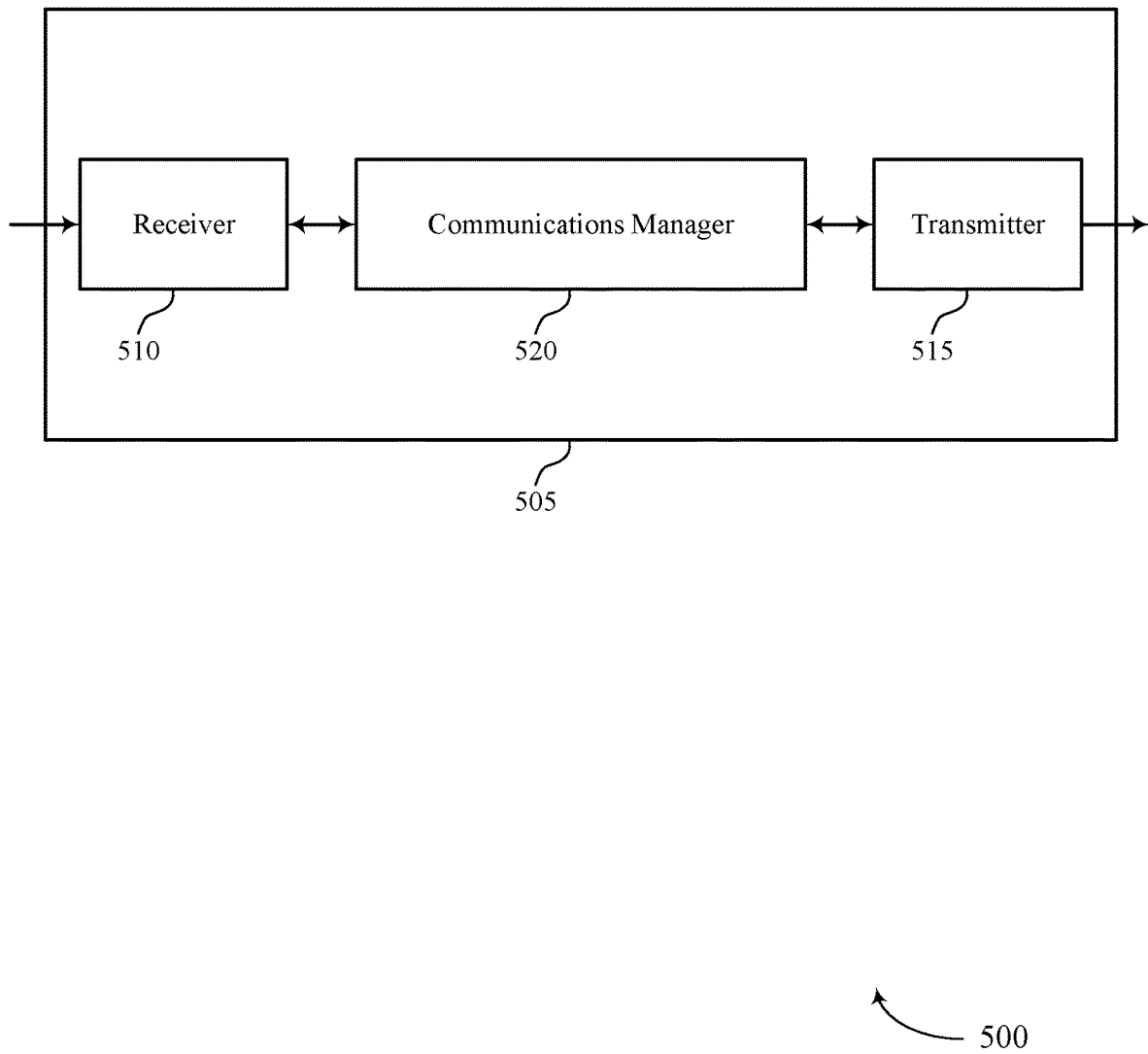
FIGS. 5 and 6 show block diagrams of devices that support measurement techniques for reporting beams in accordance with aspects of the present disclosure.

FIG. 5 shows a block diagram 500 of a device 505 that supports measurement techniques for reporting beams in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to measurement techniques for reporting beams). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to measurement techniques for reporting beams). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of measurement techniques for reporting beams as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for identifying a configuration for reporting a set of directional beams and measurement information for the set of directional beams, the configuration including at least a first metric for selecting the set of directional beams from a set of multiple candidate directional beams and a second metric, that is different from the first metric, for determining the measurement information. The communications manager 520 may be configured as or otherwise support a means for selecting the set of directional beams according to the first metric. The communications manager 520 may be configured as or otherwise support a means for transmitting, to a base station, a report indicating the measurement information according to the second metric and the set of directional beams.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing. The techniques described herein may allow the device 505 to select reported beams based on average signal measurements. By using average signal measurements to select reported beams, the device 505 may indicate overall good beams (e.g., beams with an average signal measurement above a threshold) to a base station. If the base station utilizes the beams indicated by the device 505 to transmit signals to the device 505, the device 505 may receive the signals with reduced overall processing (e.g., perform less filtering to mitigate interference) when compared to the using directional beams based on instantaneous signal measurements.

Figure 6:
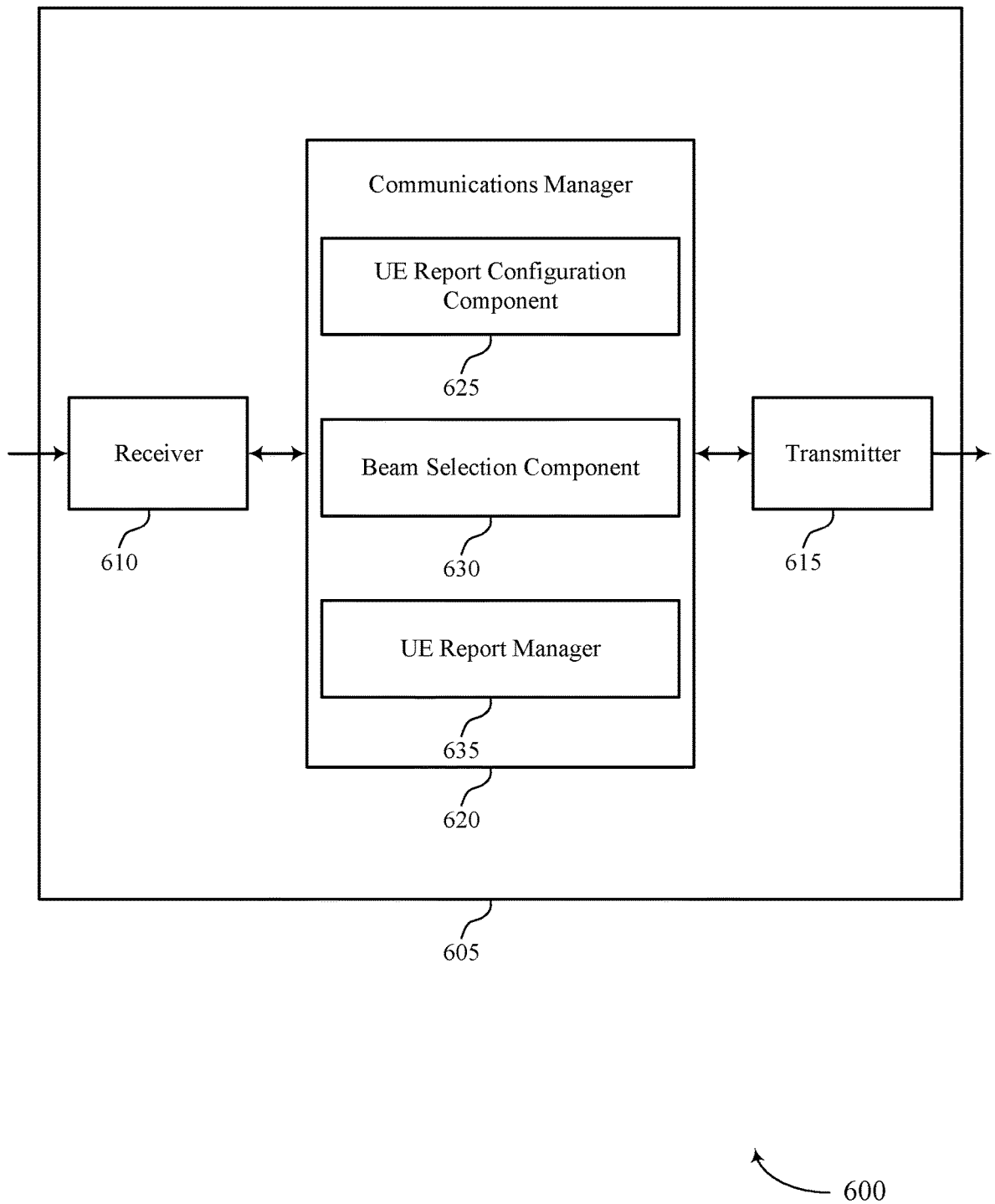

FIG. 6 shows a block diagram 600 of a device 605 that supports measurement techniques for reporting beams in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to measurement techniques for reporting beams). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to measurement techniques for reporting beams). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of measurement techniques for reporting beams as described herein. For example, the communications manager 620 may include a UE report configuration component 625, a beam selection component 630, a UE report manager 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The UE report configuration component 625 may be configured as or otherwise support a means for identifying a configuration for reporting a set of directional beams and measurement information for the set of directional beams, the configuration including at least a first metric for selecting the set of directional beams from a set of multiple candidate directional beams and a second metric, that is different from the first metric, for determining the measurement information. The beam selection component 630 may be configured as or otherwise support a means for selecting the set of directional beams according to the first metric. The UE report manager 635 may be configured as or otherwise support a means for transmitting, to a base station, a report indicating the measurement information according to the second metric and the set of directional beams.

Figure 7:
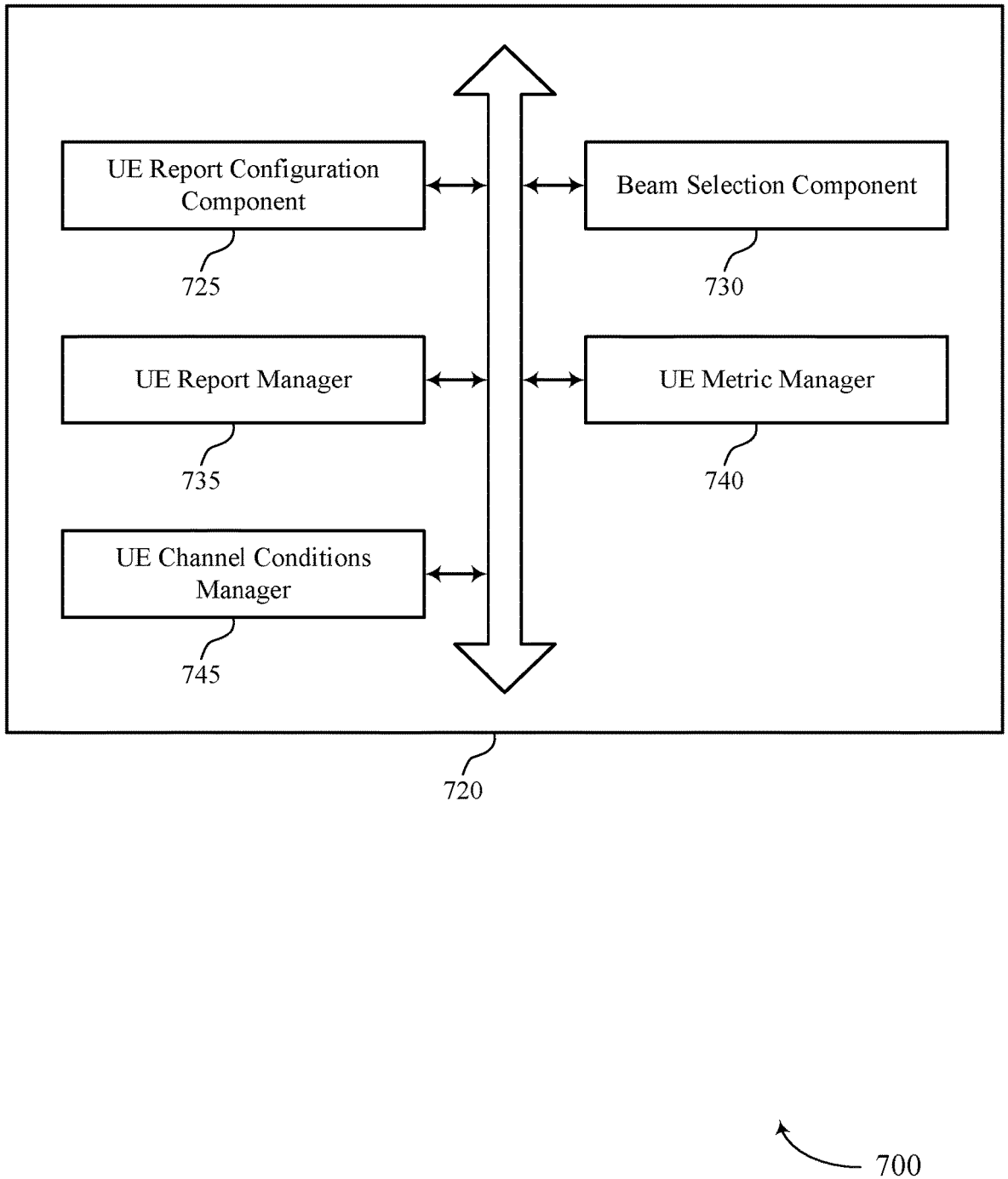
FIG. 7 shows a block diagram of a communications manager that supports measurement techniques for reporting beams in accordance with aspects of the present disclosure.

FIG. 7 shows a block diagram 700 of a communications manager 720 that supports measurement techniques for reporting beams in accordance with aspects of the present disclosure. The communications manager 720 may be an example of aspects of a communications manager 520, a communications manager 620, or both, as described herein. The communications manager 720, or various components thereof, may be an example of means for performing various aspects of measurement techniques for reporting beams as described herein. For example, the communications manager 720 may include a UE report configuration component 725, a beam selection component 730, a UE report manager 735, a UE metric manager 740, a UE channel conditions manager 745, or any combination thereof. Each of these components may communicate, directly or indirectly, with one another (e.g., via one or more buses).

The communications manager 720 may support wireless communication at a UE in accordance with examples as disclosed herein. The UE report configuration component 725 may be configured as or otherwise support a means for identifying a configuration for reporting a set of directional beams and measurement information for the set of directional beams, the configuration including at least a first metric for selecting the set of directional beams from a set of multiple candidate directional beams and a second metric, that is different from the first metric, for determining the measurement information. The beam selection component 730 may be configured as or otherwise support a means for selecting the set of directional beams according to the first metric. The UE report manager 735 may be configured as or otherwise support a means for transmitting, to a base station, a report indicating the measurement information according to the second metric and the set of directional beams.

In some examples, to support identifying the configuration, the UE report configuration component 725 may be configured as or otherwise support a means for receiving signaling indicating the configuration from the base station. In some examples, the signaling indicating the configuration includes radio resource control signaling, MAC-CE signaling, or DCI signaling.

In some examples, the UE metric manager 740 may be configured as or otherwise support a means for transmitting signaling indicating the first metric and the second metric to the base station, where transmitting the signaling indicating the first metric and the second metric is based on identifying the configuration.

In some examples, the signaling indicating the first metric and the second metric includes MAC-CE signaling or PUCCH signaling. In some examples, the signaling indicating the first metric and the second metric includes an indication in the report.

In some examples, the UE channel conditions manager 745 may be configured as or otherwise support a means for determining a change in channel conditions, where identifying the configuration is based on determining the change in channel conditions.

In some examples, the first metric includes average RSRP over a time duration and the second metric includes instantaneous RSRP. In some examples, the first metric includes average SINR over a time duration and the second metric includes instantaneous SINR. In some examples, the first metric includes RSRP and the second metric includes SINR. In some examples, the first metric includes SINR and the second metric includes RSRP. In some examples, the report indicating the measurement information includes a CSI report.

Figure 8:
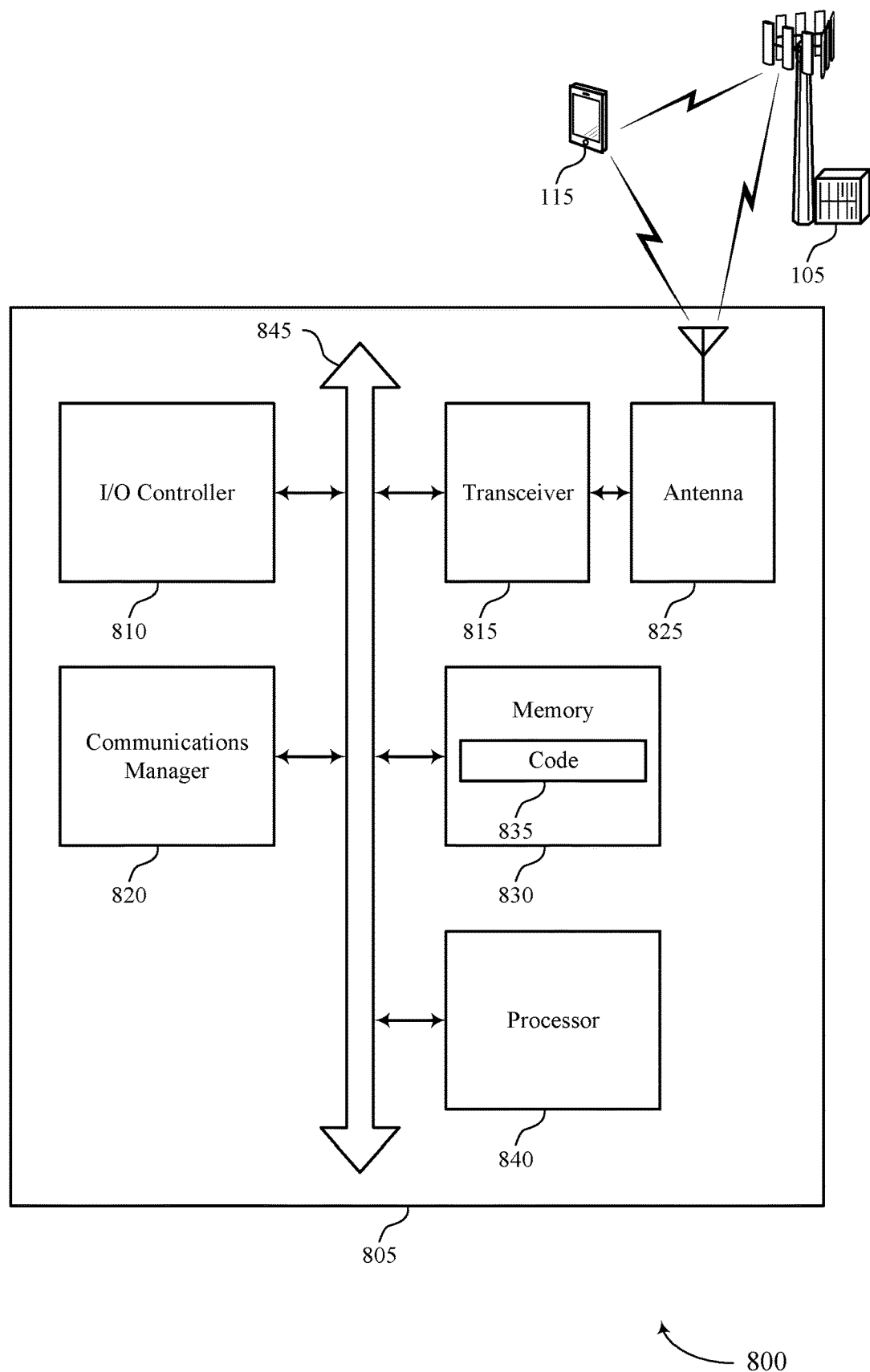
FIG. 8 shows a diagram of a system including a device that supports measurement techniques for reporting beams in accordance with aspects of the present disclosure.

FIG. 8 shows a diagram of a system 800 including a device 805 that supports measurement techniques for reporting beams in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting measurement techniques for reporting beams). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for identifying a configuration for reporting a set of directional beams and measurement information for the set of directional beams, the configuration including at least a first metric for selecting the set of directional beams from a set of multiple candidate directional beams and a second metric, that is different from the first metric, for determining the measurement information. The communications manager 820 may be configured as or otherwise support a means for selecting the set of directional beams according to the first metric. The communications manager 820 may be configured as or otherwise support a means for transmitting, to a base station, a report indicating the measurement information according to the second metric and the set of directional beams.

By including or configuring the communications manager 820 in accordance with examples as described herein, the device 805 may support techniques for improved communication reliability and improved coordination between devices. For example, by selecting beams using a first metric (e.g., average SINR) and reporting measurement information for the selected beams using a second metric (e.g., instantaneous SINR), the device 805 may provide a base station with the best overall beams (e.g., in terms of average SINR) as well as measurement information related to the current state of the beams (e.g., instantaneous SINR). This may allow the base station to make more reliable scheduling decisions and in some cases, may improve coordination between the devices.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of measurement techniques for reporting beams as described herein, or the processor 840 and the memory 830 may be otherwise configured to perform or support such operations.

Figure 9:
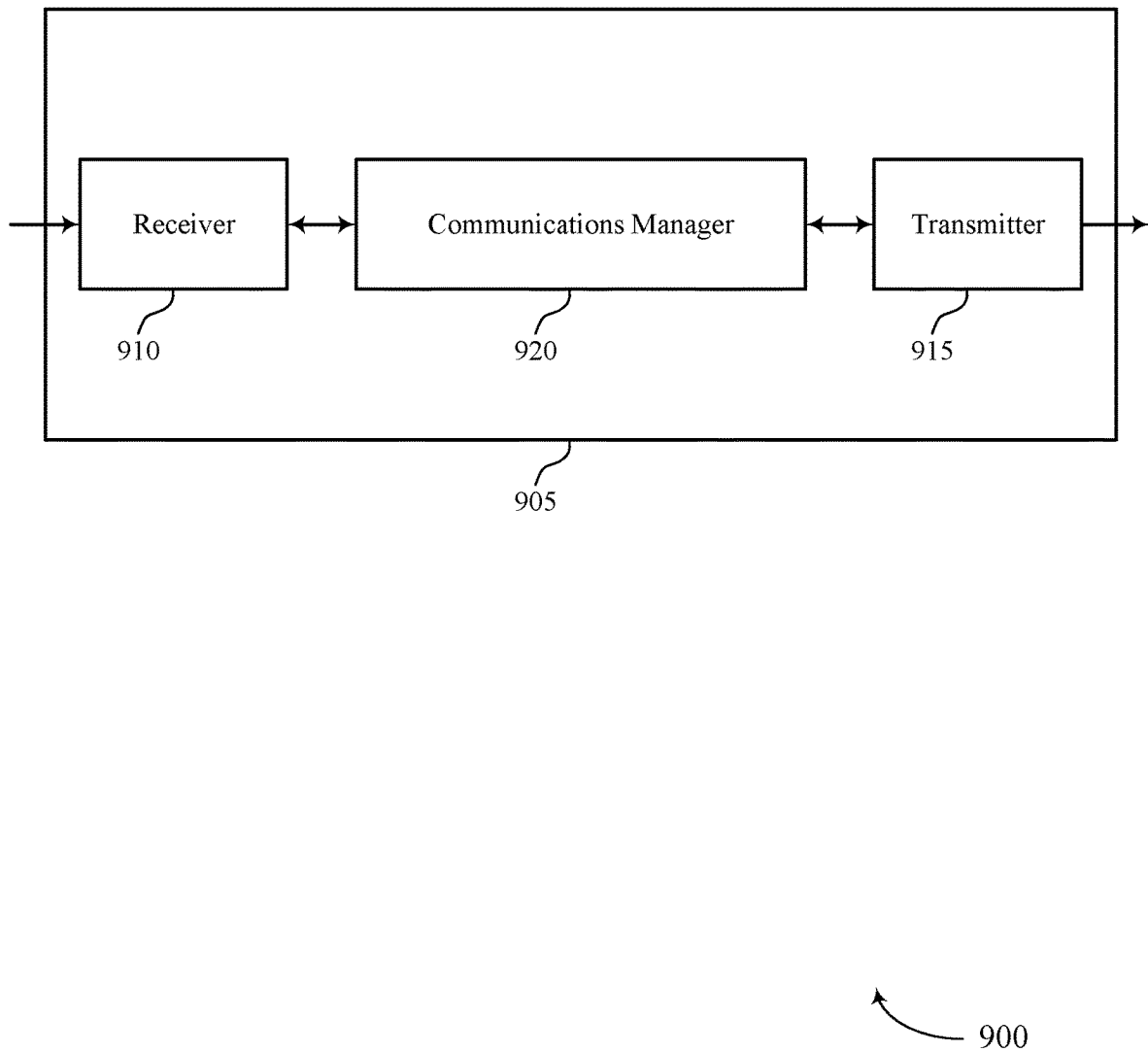
FIGS. 9 and 10 show block diagrams of devices that support measurement techniques for reporting beams in accordance with aspects of the present disclosure.

FIG. 9 shows a block diagram 900 of a device 905 that supports measurement techniques for reporting beams in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to measurement techniques for reporting beams). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to measurement techniques for reporting beams). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of measurement techniques for reporting beams as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for identifying a configuration for a UE to report a set of directional beams and measurement information for the set of directional beams, the configuration including at least a first metric for the UE to select the set of directional beams from a set of multiple candidate directional beams and a second metric, that is different from the first metric, for the UE to determine the measurement information. The communications manager 920 may be configured as or otherwise support a means for receiving, from the UE, a report indicating the measurement information according to the second metric and the set of directional beams.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing.

Figure 10:
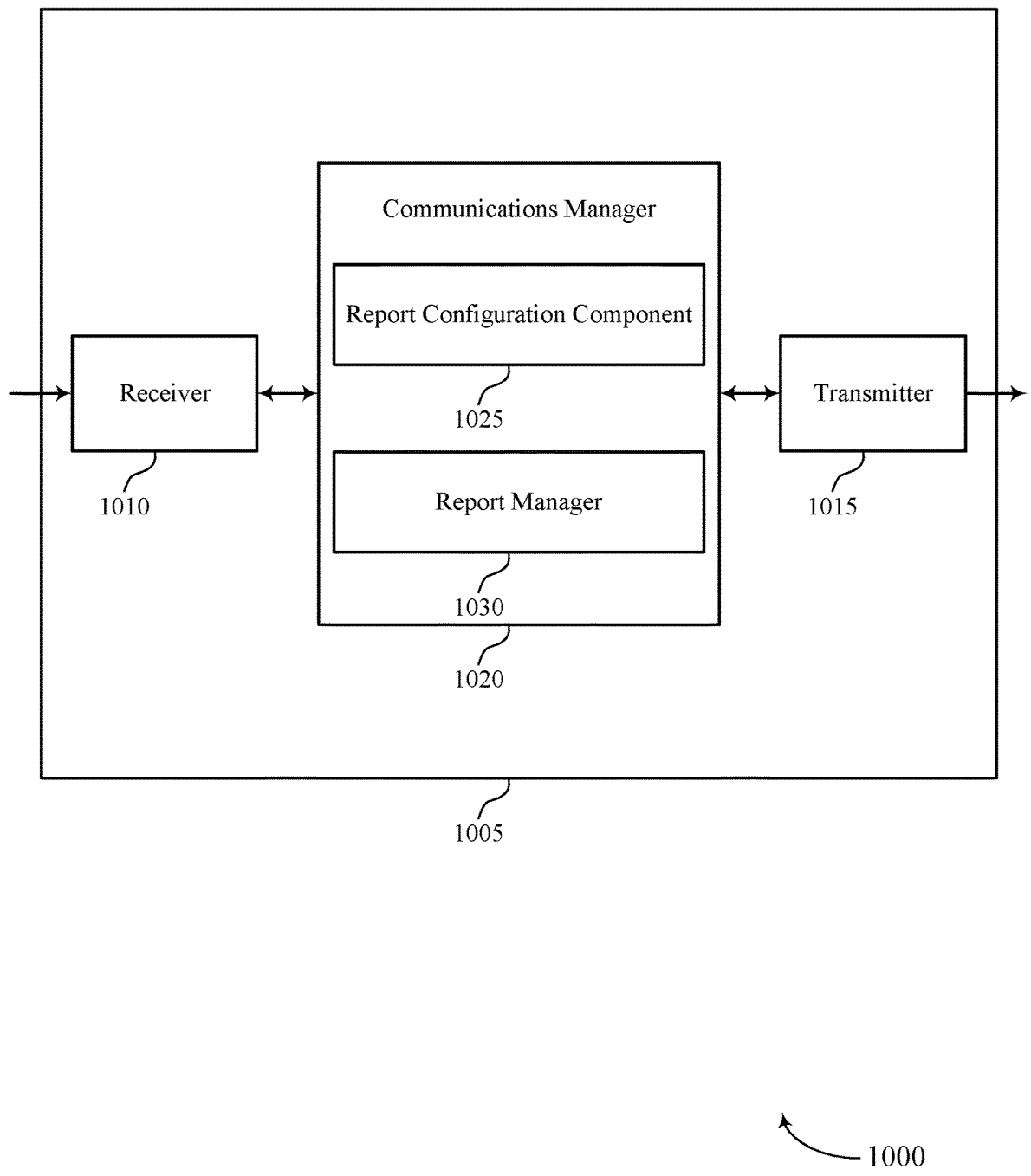

FIG. 10 shows a block diagram 1000 of a device 1005 that supports measurement techniques for reporting beams in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to measurement techniques for reporting beams). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to measurement techniques for reporting beams). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of measurement techniques for reporting beams as described herein. For example, the communications manager 1020 may include a report configuration component 1025 a report manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The report configuration component 1025 may be configured as or otherwise support a means for identifying a configuration for a UE to report a set of directional beams and measurement information for the set of directional beams, the configuration including at least a first metric for the UE to select the set of directional beams from a set of multiple candidate directional beams and a second metric, that is different from the first metric, for the UE to determine the measurement information. The report manager 1030 may be configured as or otherwise support a means for receiving, from the UE, a report indicating the measurement information according to the second metric and the set of directional beams.

Figure 11:
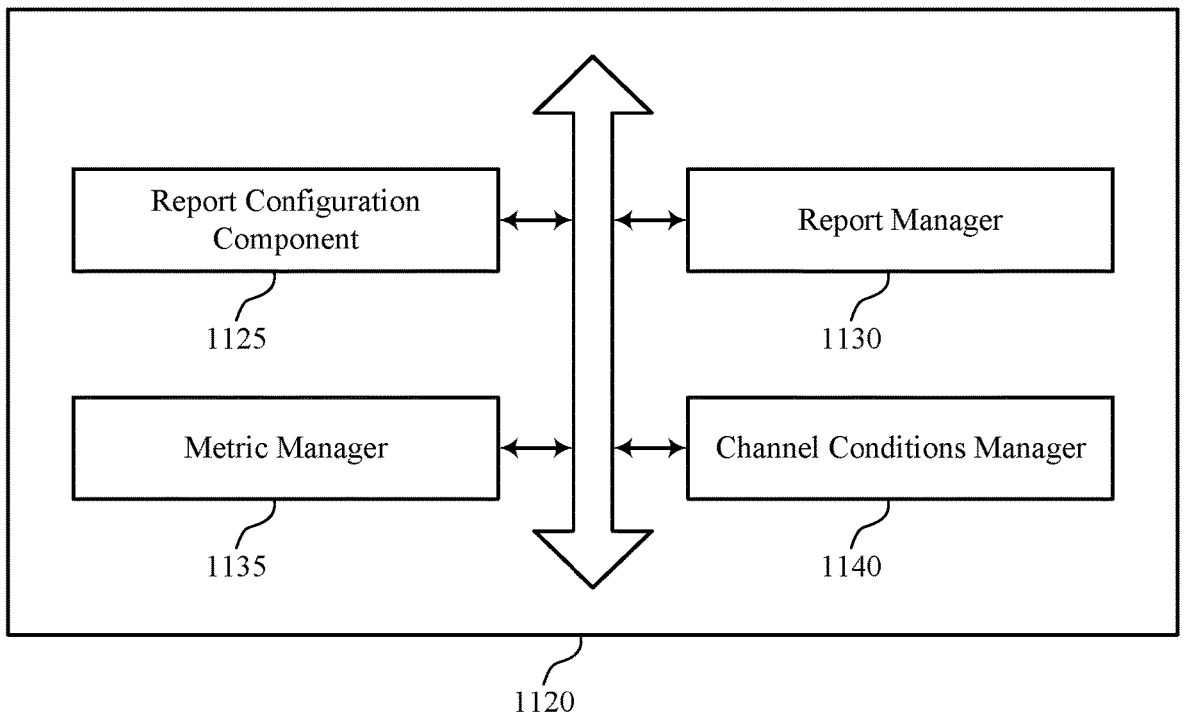
FIG. 11 shows a block diagram of a communications manager that supports measurement techniques for reporting beams in accordance with aspects of the present disclosure.

FIG. 11 shows a block diagram 1100 of a communications manager 1120 that supports measurement techniques for reporting beams in accordance with aspects of the present disclosure. The communications manager 1120 may be an example of aspects of a communications manager 920, a communications manager 1020, or both, as described herein. The communications manager 1120, or various components thereof, may be an example of means for performing various aspects of measurement techniques for reporting beams as described herein. For example, the communications manager 1120 may include a report configuration component 1125, a report manager 1130, a metric manager 1135, a channel conditions manager 1140, or any combination thereof. Each of these components may communicate, directly or indirectly, with one another (e.g., via one or more buses).

The communications manager 1120 may support wireless communication at a base station in accordance with examples as disclosed herein. The report configuration component 1125 may be configured as or otherwise support a means for identifying a configuration for a UE to report a set of directional beams and measurement information for the set of directional beams, the configuration including at least a first metric for the UE to select the set of directional beams from a set of multiple candidate directional beams and a second metric, that is different from the first metric, for the UE to determine the measurement information. The report manager 1130 may be configured as or otherwise support a means for receiving, from the UE, a report indicating the measurement information according to the second metric and the set of directional beams.

In some examples, to support identifying the configuration, the report configuration component 1125 may be configured as or otherwise support a means for transmitting signaling indicating the configuration to the UE.

In some examples, the signaling indicating the configuration includes radio resource control signaling, MAC-CE signaling, or DCI signaling.

In some examples, the metric manager 1135 may be configured as or otherwise support a means for receiving signaling indicating the first metric and the second metric from the UE, where identifying the configuration is based on receiving the signaling indicating the first metric and the second metric.

In some examples, the signaling indicating the first metric and the second metric includes MAC-CE signaling or PUCCH signaling. In some examples, the signaling indicating the first metric and the second metric includes an indication in the report.

In some examples, the channel conditions manager 1140 may be configured as or otherwise support a means for determining a change in channel conditions, where identifying the configuration is based on determining the change in channel conditions.

In some examples, the first metric includes average RSRP over a time duration and the second metric includes instantaneous RSRP. In some examples, the first metric includes average SINR over a time duration and the second metric includes instantaneous SINR. In some examples, the first metric includes RSRP and the second metric includes SINR. In some examples, the first metric includes SINR and the second metric includes RSRP. In some examples, the report indicating the measurement information includes a CSI report.

Figure 12:
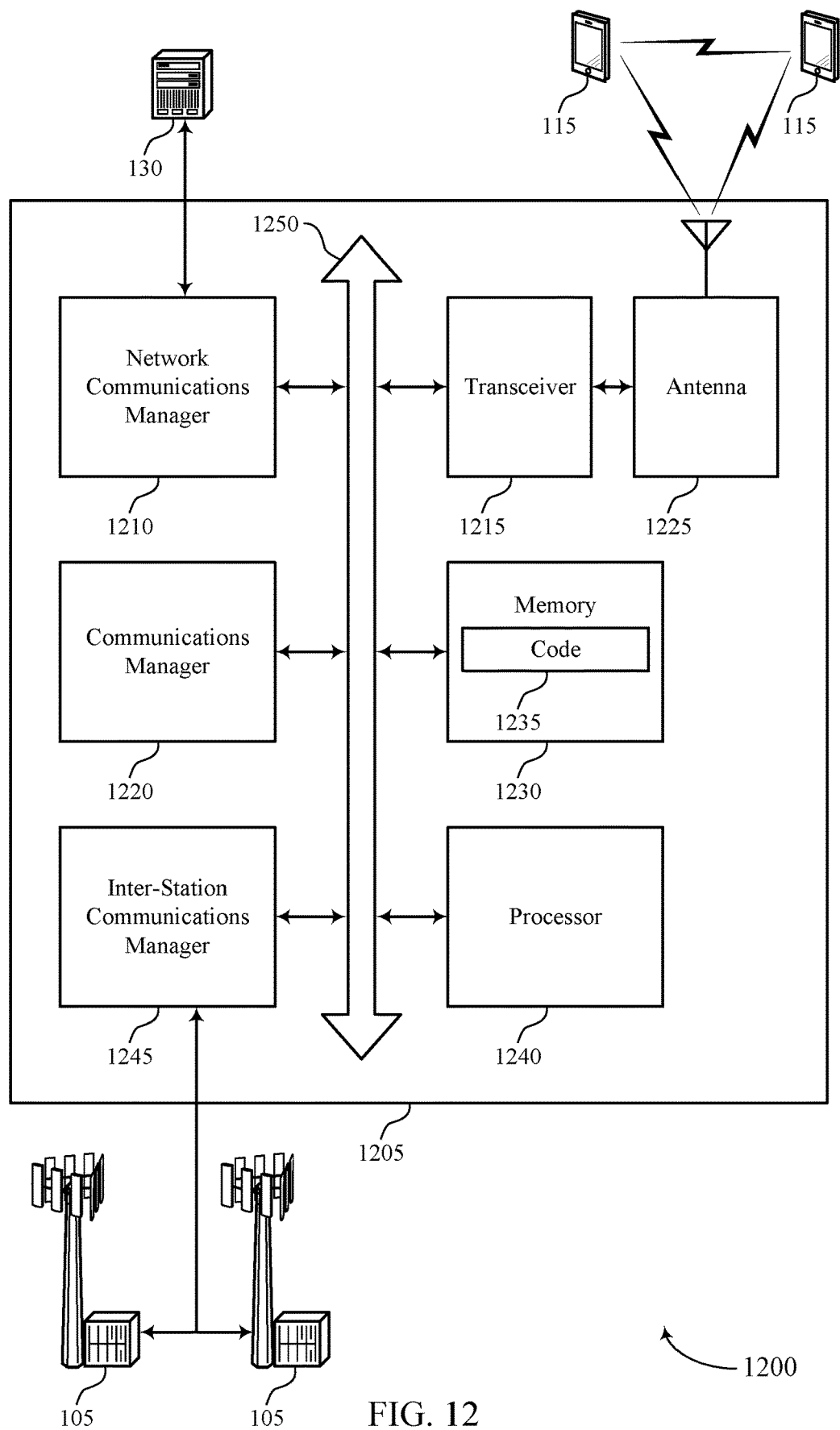
FIG. 12 shows a diagram of a system including a device that supports measurement techniques for reporting beams in accordance with aspects of the present disclosure.

FIG. 12 shows a diagram of a system 1200 including a device 1205 that supports measurement techniques for reporting beams in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting measurement techniques for reporting beams). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for identifying a configuration for a UE to report a set of directional beams and measurement information for the set of directional beams, the configuration including at least a first metric for the UE to select the set of directional beams from a set of multiple candidate directional beams and a second metric, that is different from the first metric, for the UE to determine the measurement information. The communications manager 1220 may be configured as or otherwise support a means for receiving, from the UE, a report indicating the measurement information according to the second metric and the set of directional beams.

By including or configuring the communications manager 1220 in accordance with examples as described herein, the device 1205 may support techniques for improved communication reliability and improved coordination between devices.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of measurement techniques for reporting beams as described herein, or the processor 1240 and the memory 1230 may be otherwise configured to perform or support such operations.

Figure 13:
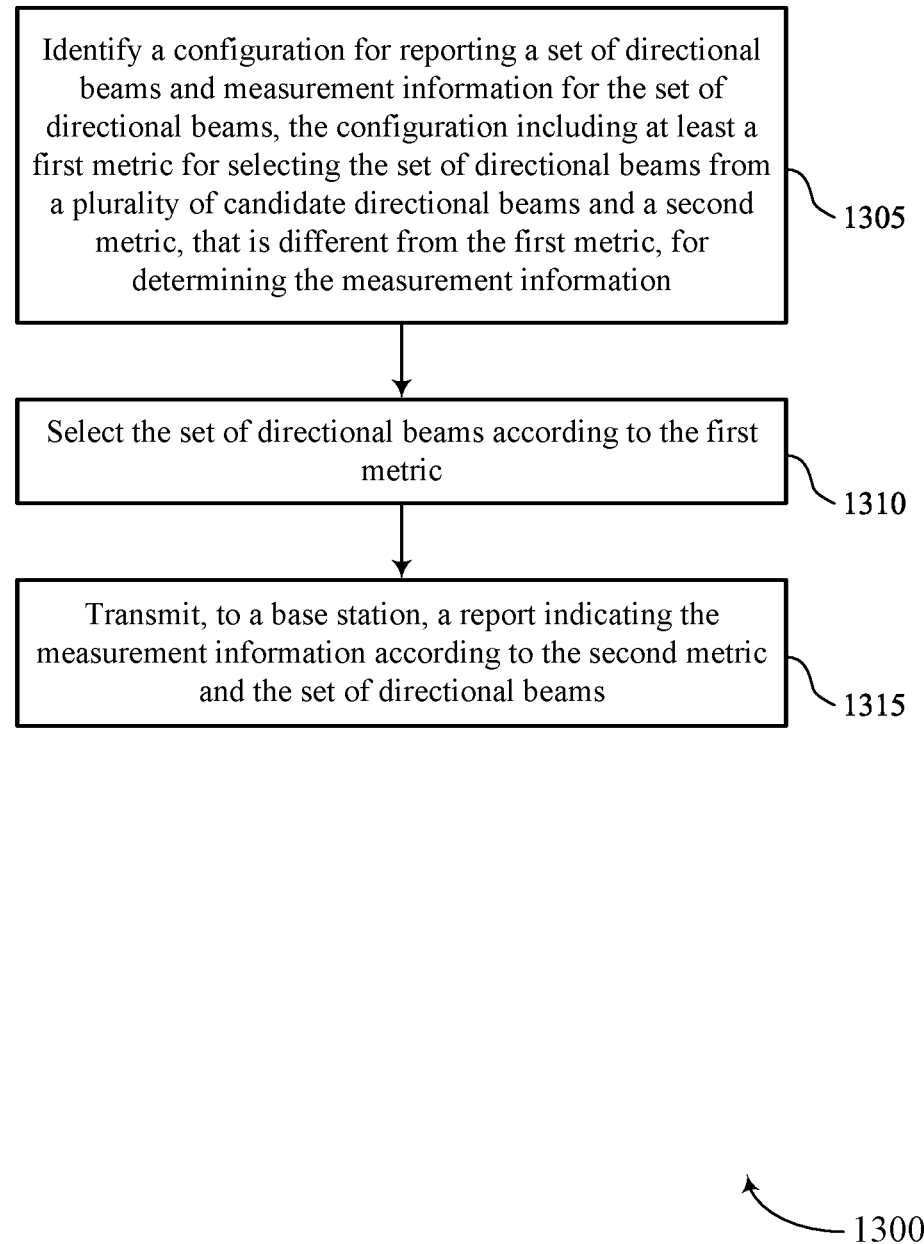
FIGS. 13 through 16 show flowcharts illustrating methods that support measurement techniques for reporting beams in accordance with aspects of the present disclosure.

FIG. 13 shows a flowchart illustrating a method 1300 that supports measurement techniques for reporting beams in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include identifying a configuration for reporting a set of directional beams and measurement information for the set of directional beams, the configuration including at least a first metric for selecting the set of directional beams from a set of multiple candidate directional beams and a second metric, that is different from the first metric, for determining the measurement information. The operations of 1305 may be performed in accordance with examples as disclosed herein. In some examples, aspects of the operations of 1305 may be performed by a UE report configuration component 725 as described with reference to FIG. 7.

At 1310, the method may include selecting the set of directional beams according to the first metric. The operations of 1310 may be performed in accordance with examples as disclosed herein. In some examples, aspects of the operations of 1310 may be performed by a beam selection component 730 as described with reference to FIG. 7.

At 1315, the method may include transmitting, to a base station, a report indicating the measurement information according to the second metric and the set of directional beams. The operations of 1315 may be performed in accordance with examples as disclosed herein. In some examples, aspects of the operations of 1315 may be performed by a UE report manager 735 as described with reference to FIG. 7.

Figure 14:
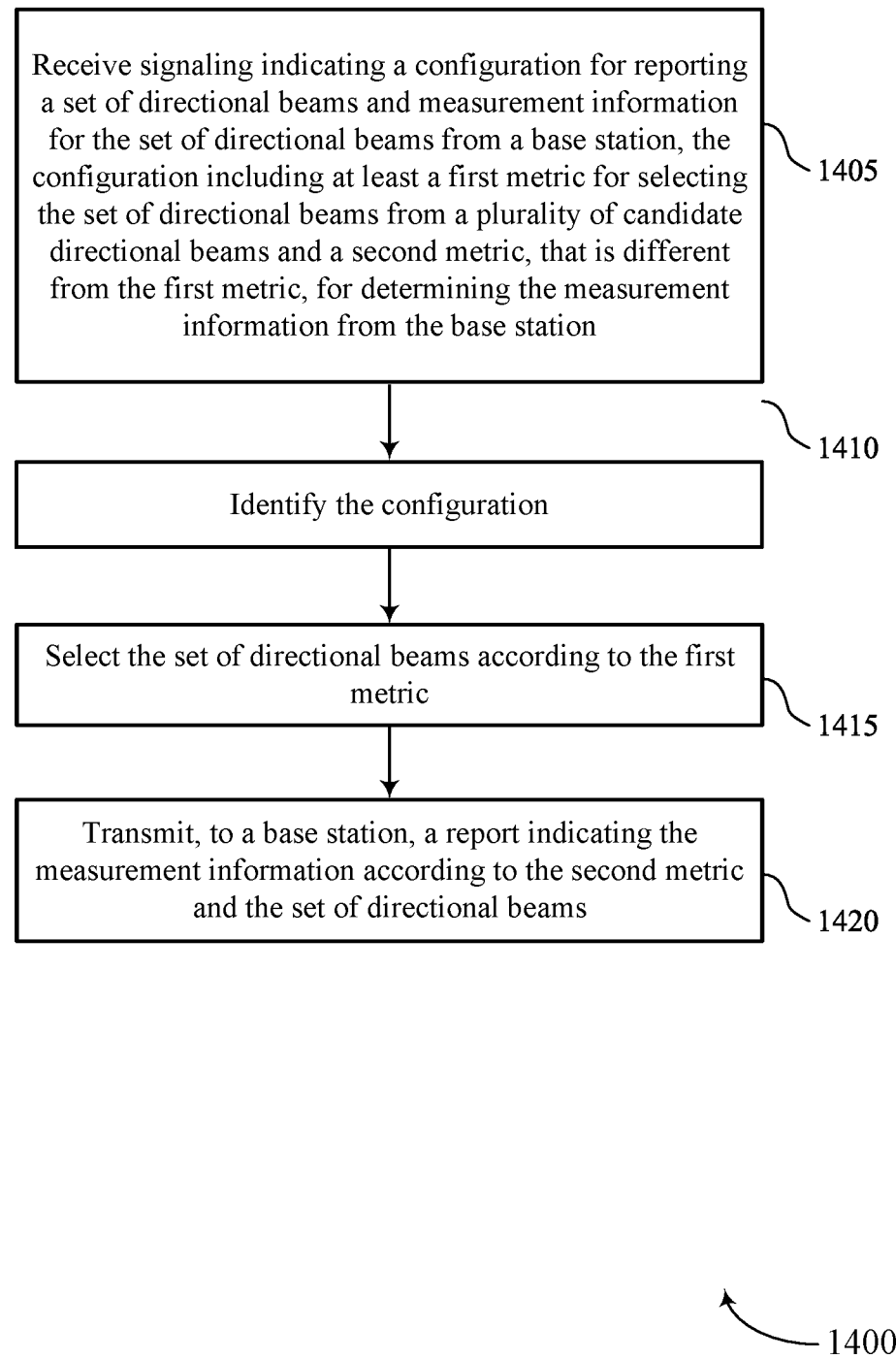

FIG. 14 shows a flowchart illustrating a method 1400 that supports measurement techniques for reporting beams in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving signaling indicating a configuration for reporting a set of directional beams and measurement information for the set of directional beams from a base station, the configuration including at least a first metric for selecting the set of directional beams from a set of multiple candidate directional beams and a second metric, that is different from the first metric, for determining the measurement information. The operations of 1405 may be performed in accordance with examples as disclosed herein. In some examples, aspects of the operations of 1405 may be performed by a UE report configuration component 725 as described with reference to FIG. 7.

At 1410, the method may include identifying the configuration. The operations of 1410 may be performed in accordance with examples as disclosed herein. In some examples, aspects of the operations of 1410 may be performed by a UE report configuration component 725 as described with reference to FIG. 7.

At 1415, the method may include selecting the set of directional beams according to the first metric. The operations of 1415 may be performed in accordance with examples as disclosed herein. In some examples, aspects of the operations of 1415 may be performed by a beam selection component 730 as described with reference to FIG. 7.

At 1420, the method may include transmitting, to a base station, a report indicating the measurement information according to the second metric and the set of directional beams. The operations of 1420 may be performed in accordance with examples as disclosed herein. In some examples, aspects of the operations of 1420 may be performed by a UE report manager 735 as described with reference to FIG. 7.

Figure 15:
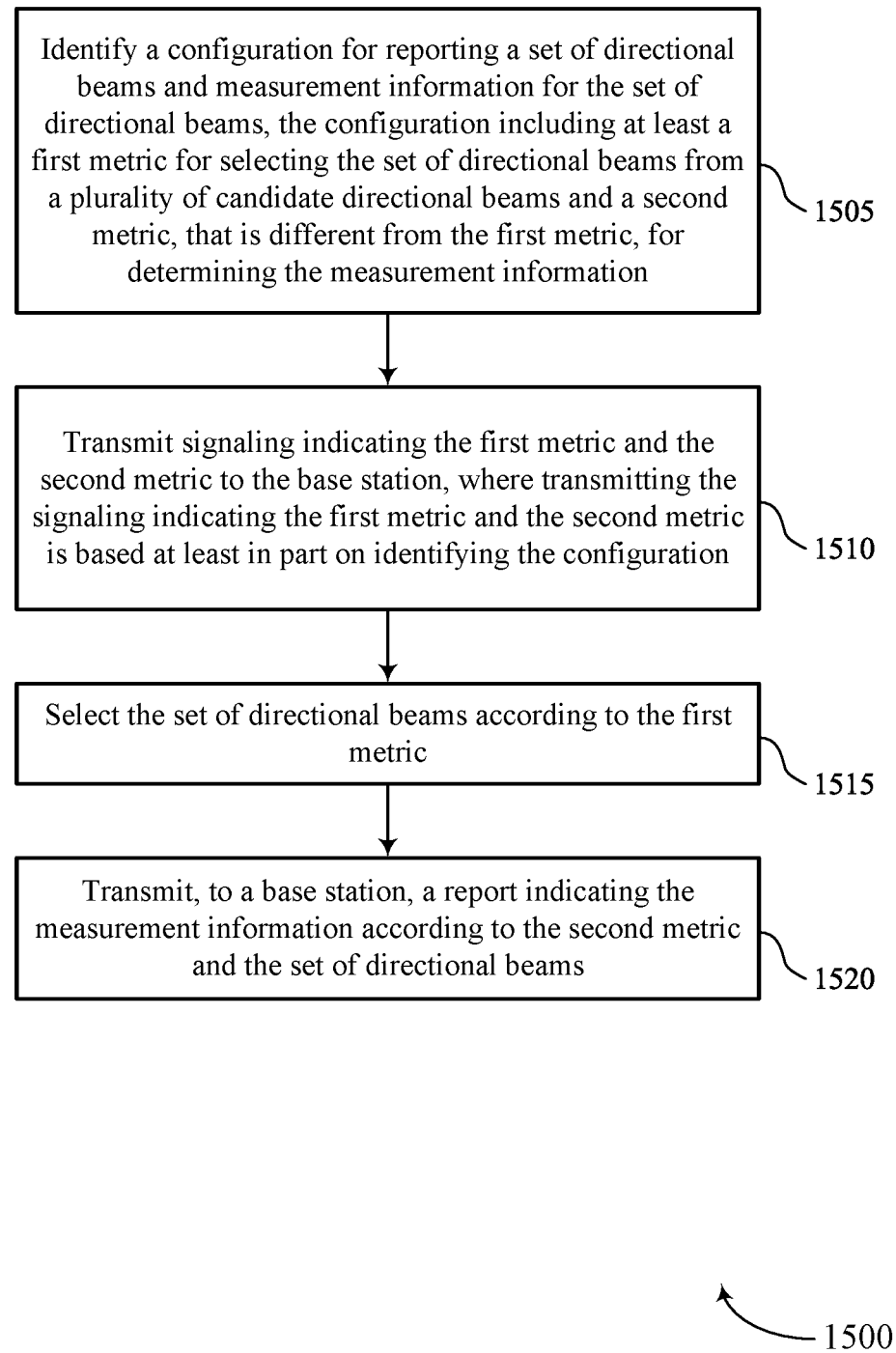

FIG. 15 shows a flowchart illustrating a method 1500 that supports measurement techniques for reporting beams in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include identifying a configuration for reporting a set of directional beams and measurement information for the set of directional beams, the configuration including at least a first metric for selecting the set of directional beams from a set of multiple candidate directional beams and a second metric, that is different from the first metric, for determining the measurement information. The operations of 1505 may be performed in accordance with examples as disclosed herein. In some examples, aspects of the operations of 1505 may be performed by a UE report configuration component 725 as described with reference to FIG. 7.

At 1510, the method may include transmitting signaling indicating the first metric and the second metric to the base station, where transmitting the signaling indicating the first metric and the second metric is based on identifying the configuration. The operations of 1510 may be performed in accordance with examples as disclosed herein. In some examples, aspects of the operations of 1510 may be performed by a UE metric manager 740 as described with reference to FIG. 7.

At 1515, the method may include selecting the set of directional beams according to the first metric. The operations of 1515 may be performed in accordance with examples as disclosed herein. In some examples, aspects of the operations of 1515 may be performed by a beam selection component 730 as described with reference to FIG. 7.

At 1520, the method may include transmitting, to a base station, a report indicating the measurement information according to the second metric and the set of directional beams. The operations of 1520 may be performed in accordance with examples as disclosed herein. In some examples, aspects of the operations of 1520 may be performed by a UE report manager 735 as described with reference to FIG. 7.

Figure 16:
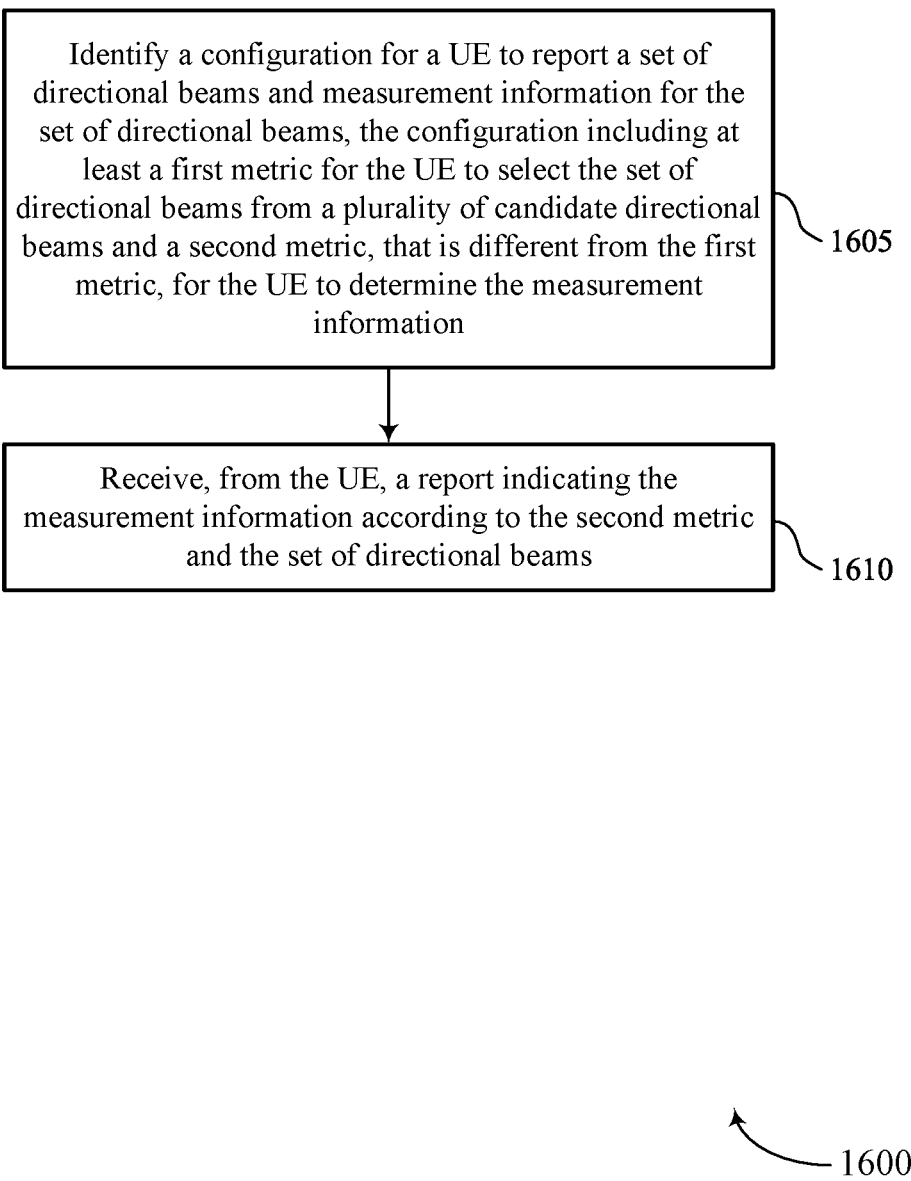

FIG. 16 shows a flowchart illustrating a method 1600 that supports measurement techniques for reporting beams in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include identifying a configuration for a UE to report a set of directional beams and measurement information for the set of directional beams, the configuration including at least a first metric for the UE to select the set of directional beams from a set of multiple candidate directional beams and a second metric, that is different from the first metric, for the UE to determine the measurement information. The operations of 1605 may be performed in accordance with examples as disclosed herein. In some examples, aspects of the operations of 1605 may be performed by a report configuration component 1125 as described with reference to FIG. 11.

At 1610, the method may include receiving, from the UE, a report indicating the measurement information according to the second metric and the set of directional beams. The operations of 1610 may be performed in accordance with examples as disclosed herein. In some examples, aspects of the operations of 1610 may be performed by a report manager 1130 as described with reference to FIG. 11.

The following provides an overview of aspects of the present disclosure:

Aspect 1: A method for wireless communication at a UE, comprising: identifying a configuration for reporting a set of directional beams and measurement information for the set of directional beams, the configuration including at least a first metric for selecting the set of directional beams from a plurality of candidate directional beams and a second metric, that is different from the first metric, for determining the measurement information; selecting the set of directional beams according to the first metric; and transmitting, to a base station, a report indicating the measurement information according to the second metric and the set of directional beams.

Aspect 2: The method of aspect 1, wherein identifying the configuration comprises: receiving signaling indicating the configuration from the base station.

Aspect 3: The method of aspect 2, wherein the signaling indicating the configuration comprises RRC signaling, MAC-CE signaling, or DCI signaling.

Aspect 4: The method of any of aspects 1 through 3, further comprising: transmitting signaling indicating the first metric and the second metric to the base station, wherein transmitting the signaling indicating the first metric and the second metric is based at least in part on identifying the configuration.

Aspect 5: The method of aspect 4, wherein the signaling indicating the first metric and the second metric comprises MAC-CE signaling or PUCCH signaling.

Aspect 6: The method of any of aspects 4 through 5, wherein the signaling indicating the first metric and the second metric comprises an indication in the report.

Aspect 7: The method of any of aspects 1 through 6, further comprising: determining a change in channel conditions, wherein identifying the configuration is based at least in part on determining the change in channel conditions.

Aspect 8: The method of any of aspects 1 through 7, wherein the first metric comprises average RSRP over a time duration and the second metric comprises instantaneous RSRP.

Aspect 9: The method of any of aspects 1 through 7, wherein the first metric comprises average SINR over a time duration and the second metric comprises instantaneous SINR.

Aspect 10: The method of any of aspects 1 through 7, wherein the first metric comprises RSRP and the second metric comprises SINR.

Aspect 11: The method of any of aspects 1 through 7, wherein the first metric comprises SINR and the second metric comprises RSRP.

Aspect 12: The method of any of aspects 1 through 11, wherein the report indicating the measurement information comprises a CSI report.

Aspect 13: A method for wireless communication at a base station, comprising: identifying a configuration for a UE to report a set of directional beams and measurement information for the set of directional beams, the configuration including at least a first metric for the UE to select the set of directional beams from a plurality of candidate directional beams and a second metric, that is different from the first metric, for the UE to determine the measurement information; and receiving, from the UE, a report indicating the measurement information according to the second metric and the set of directional beams.

Aspect 14: The method of aspect 13, wherein identifying the configuration comprises: transmitting signaling indicating the configuration to the UE.

Aspect 15: The method of aspect 14, wherein the signaling indicating the configuration comprises RRC signaling, MAC-CE signaling, or DCI signaling.

Aspect 16: The method of any of aspects 13 through 15, further comprising: receiving signaling indicating the first metric and the second metric from the UE, wherein identifying the configuration is based at least in part on receiving the signaling indicating the first metric and the second metric.

Aspect 17: The method of aspect 16, wherein the signaling indicating the first metric and the second metric comprises MAC-CE signaling or PUCCH signaling.

Aspect 18: The method of any of aspects 16 through 17, wherein the signaling indicating the first metric and the second metric comprises an indication in the report.

Aspect 19: The method of any of aspects 13 through 18, further comprising: determining a change in channel conditions, wherein identifying the configuration is based at least in part on determining the change in channel conditions.

Aspect 20: The method of any of aspects 13 through 19, wherein the first metric comprises average RSRP over a time duration and the second metric comprises instantaneous RSRP.

Aspect 21: The method of any of aspects 13 through 19, wherein the first metric comprises average SINR over a time duration and the second metric comprises instantaneous SINR.

Aspect 22: The method of any of aspects 13 through 19, wherein the first metric comprises RSRP and the second metric comprises SINR ratio.

Aspect 23: The method of any of aspects 13 through 19, wherein the first metric comprises SINR and the second metric comprises RSRP.

Aspect 24: The method of any of aspects 13 through 23, wherein the report indicating the measurement information comprises a CSI report.

Aspect 25: An apparatus for wireless communication at a UE, comprising a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    identifying a configuration for reporting a set of directional beams and measurement information for the set of directional beams, the configuration including at least a first metric for selecting the set of directional beams from a plurality of candidate directional beams and a second metric, that is different from the first metric, for determining the measurement information, wherein the first metric comprises an average signal strength measurement value over a time duration and the second metric comprises an instantaneous signal strength measurement value;
    selecting the set of directional beams according to the first metric; and
    transmitting, to a network device, a report indicating the measurement information according to the second metric and the set of directional beams.

2. The method of claim 1, wherein identifying the configuration comprises:
    receiving signaling indicating the configuration from the network device.

3. The method of claim 2, wherein the signaling indicating the configuration comprises radio resource control signaling, medium access control control element signaling, or downlink control information signaling.

4. The method of claim 1, further comprising:
    transmitting signaling indicating the first metric and the second metric to the network device, wherein transmitting the signaling indicating the first metric and the second metric is based at least in part on identifying the configuration.

5. The method of claim 4, wherein the signaling indicating the first metric and the second metric comprises medium access control control element signaling or physical uplink control channel signaling.

6. The method of claim 4, wherein the signaling indicating the first metric and the second metric comprises an indication in the report.

7. The method of claim 1, further comprising:
    determining a change in channel conditions, wherein identifying the configuration is based at least in part on determining the change in channel conditions.

8. The method of claim 1, wherein the first metric and the second metric comprise reference signal received power.

9. The method of claim 1, wherein the first metric and the second metric comprise signal-to-interference-plus-noise ratio.

10. The method of claim 1, wherein the first metric comprises reference signal received power and the second metric comprises signal-to-interference-plus-noise ratio.

11. The method of claim 1, wherein the first metric comprises signal-to-interference-plus-noise ratio and the second metric comprises reference signal received power.

12. The method of claim 1, wherein the report indicating the measurement information comprises a channel state information report.

13. A method for wireless communication at a network device, comprising:
    identifying a configuration for a user equipment (UE) to report a set of directional beams and measurement information for the set of directional beams, the configuration including at least a first metric for the UE to select the set of directional beams from a plurality of candidate directional beams and a second metric, that is different from the first metric, for the UE to determine the measurement information, wherein the first metric comprises an average signal strength measurement value over a time duration and the second metric comprises an instantaneous signal strength measurement value; and
    receiving, from the UE, a report indicating the measurement information according to the second metric and the set of directional beams.

14. The method of claim 13, wherein identifying the configuration comprises:
    transmitting signaling indicating the configuration to the UE.

15. The method of claim 14, wherein the signaling indicating the configuration comprises radio resource control signaling, medium access control control element signaling, or downlink control information signaling.

16. The method of claim 13, further comprising:
    receiving signaling indicating the first metric and the second metric from the UE, wherein identifying the configuration is based at least in part on receiving the signaling indicating the first metric and the second metric.

17. The method of claim 16, wherein the signaling indicating the first metric and the second metric comprises medium access control control element signaling or physical uplink control channel signaling.

18. The method of claim 16, wherein the signaling indicating the first metric and the second metric comprises an indication in the report.

19. The method of claim 13, further comprising:
    determining a change in channel conditions, wherein identifying the configuration is based at least in part on determining the change in channel conditions.

20. The method of claim 13, wherein the first metric and the second metric comprise reference signal received power.

21. The method of claim 13, wherein the first metric and the second metric comprise signal-to-interference-plus-noise ratio.

22. The method of claim 13, wherein the first metric comprises reference signal received power and the second metric comprises signal-to-interference-plus-noise ratio.

23. The method of claim 13, wherein the first metric comprises signal-to-interference-plus-noise ratio and the second metric comprises reference signal received power.

24. The method of claim 13, wherein the report indicating the measurement information comprises a channel state information report.

25. An apparatus for wireless communication at a user equipment (UE), comprising:
a processor;
memory coupled with the processor; and
instructions stored in the memory and executable by the processor to cause the apparatus to:
identify a configuration for reporting a set of directional beams and measurement information for the set of directional beams, the configuration including at least a first metric for selecting the set of directional beams from a plurality of candidate directional beams and a second metric, that is different from the first metric, for determining the measurement information, wherein the first metric comprises an average signal strength measurement value over a time duration and the second metric comprises an instantaneous signal strength measurement value;
select the set of directional beams according to the first metric; and
transmit, to a network device, a report indicating the measurement information according to the second metric and the set of directional beams.

26. The apparatus of claim 25, wherein the instructions to identify the configuration are executable by the processor to cause the apparatus to:
receive signaling indicating the configuration from the network device.

27. The apparatus of claim 25, wherein the instructions are further executable by the processor to cause the apparatus to:
transmit signaling indicating the first metric and the second metric to the network device, wherein transmitting the signaling indicating the first metric and the second metric is based at least in part on identifying the configuration.

28. An apparatus for wireless communication at a network device, comprising:
a processor;
memory coupled with the processor; and
instructions stored in the memory and executable by the processor to cause the apparatus to:
identify a configuration for a user equipment (UE) to report a set of directional beams and measurement information for the set of directional beams, the configuration including at least a first metric for the UE to select the set of directional beams from a plurality of candidate directional beams and a second metric, that is different from the first metric, for the UE to determine the measurement information, wherein the first metric comprises an average signal strength measurement value over a time duration and the second metric comprises an instantaneous signal strength measurement value; and
receive, from the UE, a report indicating the measurement information according to the second metric and the set of directional beams.

29. The apparatus of claim 28, wherein the instructions to identify the configuration are executable by the processor to cause the apparatus to:
transmit signaling indicating the configuration to the UE.

30. The apparatus of claim 28, wherein the instructions are further executable by the processor to cause the apparatus to:
receive signaling indicating the first metric and the second metric from the UE, wherein identifying the configuration is based at least in part on receiving the signaling indicating the first metric and the second metric.

* * * * *